Inventors:
James H. Starr, &
Robert A. Clark, Jr.

April 8, 1958   J. H. STARR ET AL   2,829,829
CALCULATING TABLES, AND THE LIKE
Filed Jan. 21, 1955   7 Sheets-Sheet 2

Inventors:
James H. Starr, &
Robert A. Clark, Jr.

Inventors:
James H. Starr &
Robert A. Clark, Jr.

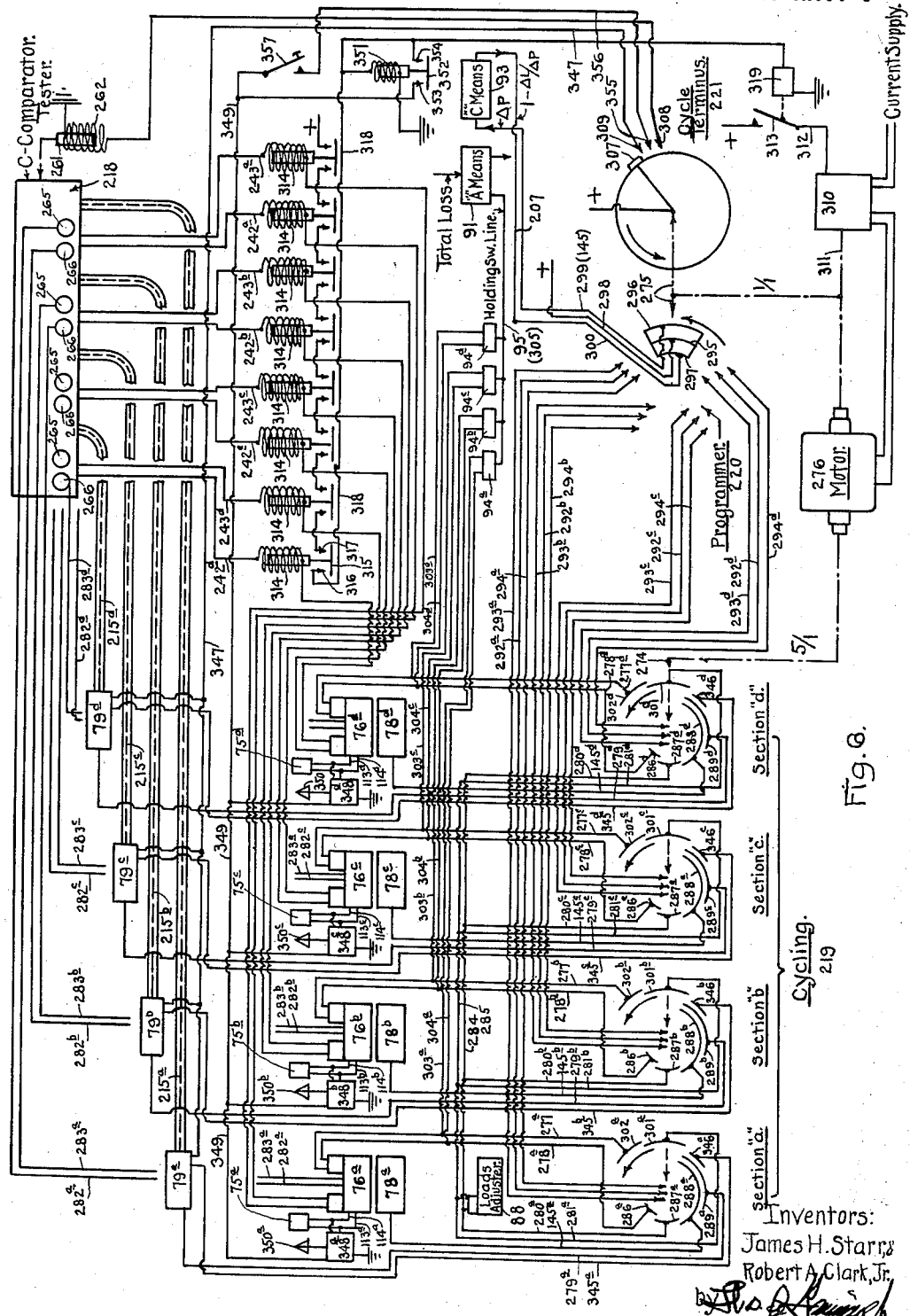

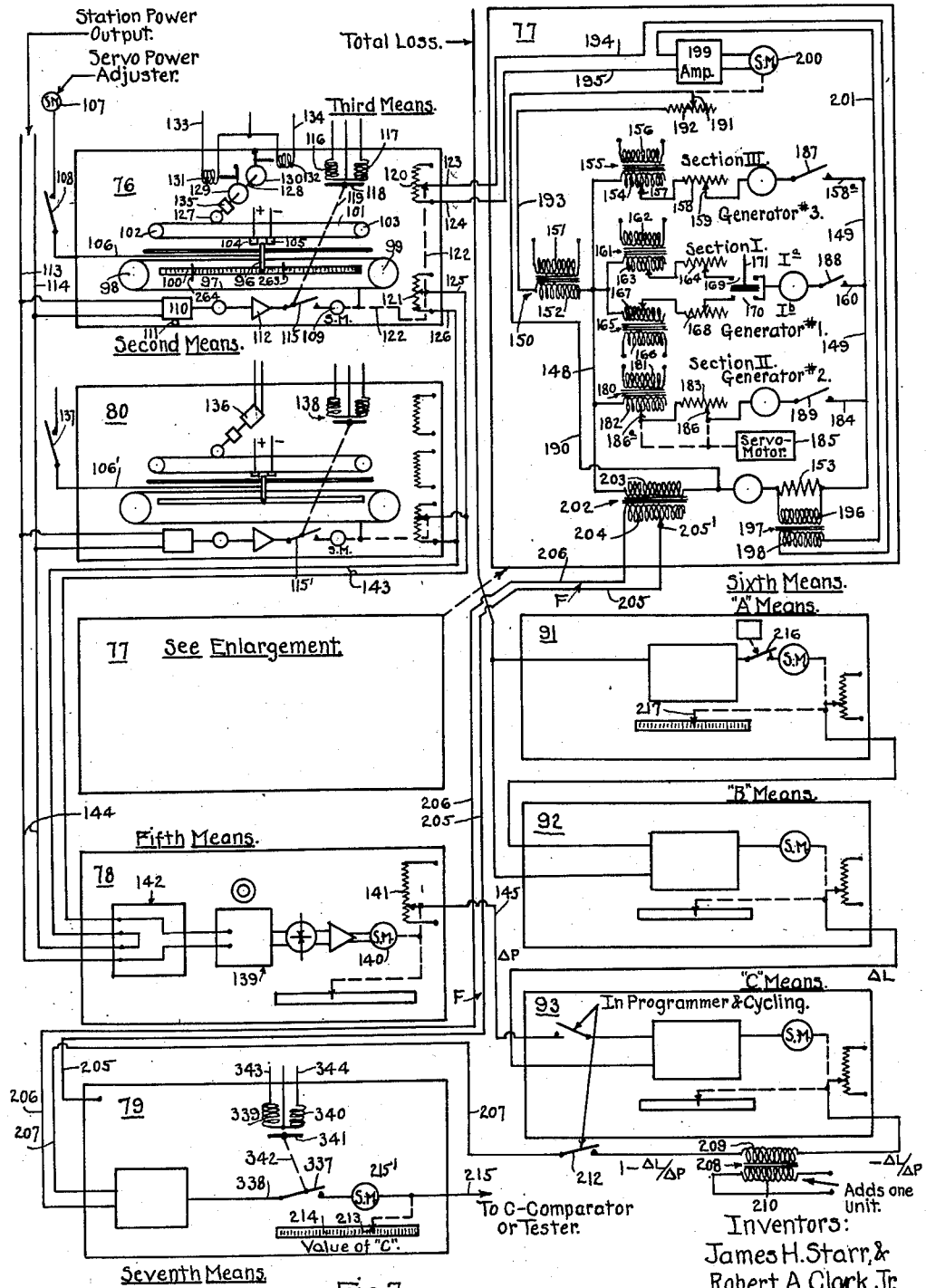

April 8, 1958  J. H. STARR ET AL  2,829,829
CALCULATING TABLES, AND THE LIKE
Filed Jan. 21, 1955  7 Sheets-Sheet 6
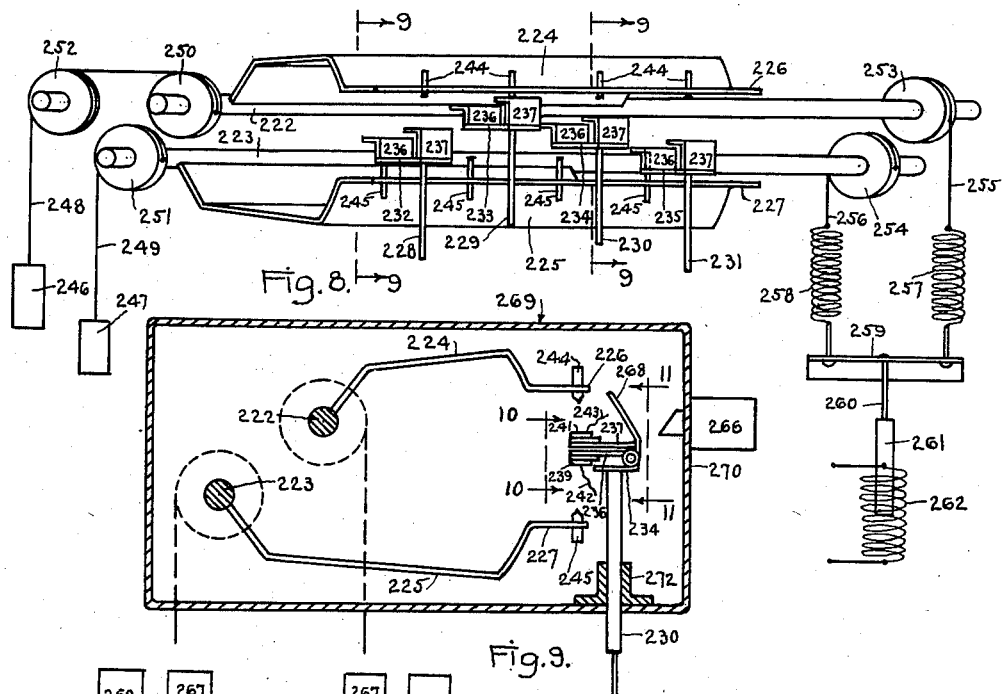
Inventors:
James H. Starr, &
Robert A. Clark, Jr.,

United States Patent Office 2,829,829
Patented Apr. 8, 1958

2,829,829

CALCULATING TABLES AND THE LIKE

James H. Starr, La Grange, and Robert A. Clark, Jr., River Forest, Ill.

Application January 21, 1955, Serial No. 483,452

37 Claims. (Cl. 235—61)

This invention relates to improvements in calculating tables, and the like. Generally speaking, the invention has to do with improvements in calculating tables which are especially adapted to the solution of problems relating to power generating and distributing network systems. More specifically, the features of invention herein disclosed concern themselves with the analysis of power distribution network systems in which the power is supplied to the network at a plurality of input points, and in which the power is delivered to the loads at a plurality of delivery points. The present invention concerns itself with the provision of means whereby it is possible to forecast the most economical division of the total load among the various power contributors, that is, in such proportions as to ensure the delivery of the total power at a minimum cost for energy. Also, to forecast the changes which must be made in the division of the total load among the various contributors of power, when changes are made in the total loading being carried by the system, or when changes are made in the amounts of the several delivered loads or the points at which said loads are delivered, etc., to again ensure delivery of the total power at a minimum cost for energy.

It is a prime object of the invention to provide means to very quickly supply information as to the optimum division of the power between the several contributors, or to provide needed information as a basis for quick determination of the optimum division of the power between the several contributors by simple operations. In a more complete aspect, the invention also discloses means to provide signals or the like whereby the actual power contributors may be controlled from time to time to automatically maintain that division of power between them which shall provide the most economical overall system operation. In the former case the information may be supplied to the load dispatcher or other supervisory authority as a basis for effecting the optimum division of the total load; in the latter case various servo-mechanisms may be caused to function in such manners as to ensure corrections in the prime mover controls of the various contributors to automatically effect the proper changes in division of total load between the several contributors.

The division of the total network load must be based on certain principles of calculation or determination which have been extensively explored mathematically and empirically by numerous students of the problems presented by the network characteristics. The calculations and determinations of the optimum division of total load between the several contributors must be based on determination of certain factors which vary with changes in the network loading itself. As the number of the loads carried by the network is increased, or as the number of power contributors is increased the complexities of the solution of the problem of optimum division of load increase very rapidly. Even with previously known means to assist the determination of the division of total load between the several power contributors much time and labor has been needed to effect determination of the optimum division of the total load. When such determination has been made, further changes in the loading of the network may have occurred, so that the practical benefits from such determination cannot be fully realized. The time needed to effect the determinations with previously known facilities for effecting such determinations has been a serious deterrent from attaining the maximum benefits which might have been gained from such determinations, when made by previously known facilities. It is an important object of the present invention to provide facilities whereby the needed determinations can be very quickly effected whenever any material changes of loading or distribution occurs on the network, so that changes in load division may be very promptly ordered and/or made to maintain the system under the optimum operating conditions from the energy cost standpoint.

The maximum economy of operation and the minimum cost of usefully delivered energy are obtained when the incremental costs of power delivered to the several loads are equal; but the determination of this equality must take proper account of the network losses since these constitute a load which must be supplied by the contributing stations in addition to the useful delivered loads. The total amount of these network losses depends on the distribution of the current flow through the various network elements. That distribution in turn depends on the division of the total supplied power among the several contributing stations. Consequently a change of division of the total power between the several contributors causes a change in load distribution over the network with corresponding change of the network losses, and since these are added to the specified total of the usefully delivered loads, results in a further change in the total power which must be fed into the network by the several suppliers. The above statements are rigorously correct except under theoretically possible but rarely encontered circumstances such as a discontinuous input-output characteristic of one or more of the power contributors. Due to these interrelated effects an extremely complex problem is presented to make the determination of the most economical division of the total power delivered into the network by the several contributors.

If a miniature network be provided to simulate the network sections and points of power supply into, and points of delivery of load from the corresponding real network; and if such simulating network be provided with section elements to include simulation of the resistive and reactive quantities of the corresponding real network sections; and if such simulating network be provided with means to adjust the values of such resistive and reactive elements and to adjust the amounts and kinds of the loads delivered from the points of loading; and if such simulating network be provided with means to vary the outputs at the points of power supply by the several contributors at the several power supply points, the following relationships will hold (I)
$$C_1 = \frac{F_1}{1-L_1} \text{ and } C_2 = \frac{F_2}{1-L_2} \text{ and } C_3 = \frac{F_3}{1-L_3} \text{ and } \ldots C_n = \frac{F_n}{1-L_n}$$

it being assumed that there are $n$ points of power contribution into the network, and that the symbols C, F and L represent the following $C_1$ designates a constant for supplying station (1)

$F_1$ designates the incremental fuel cost of the supplying station (1) with respect to the station output, under the conditions of loading of station (1) then in effect; and $L_1$ designates the rate of change of total network loss with respect to the power output of the station (1) when all system loads are increased in the same ratio and the power outputs of all other contributors are held constant.

It is understood that there will, in the following discussion, be a constant C, based on the incremental fuel cost F, and a test incremental loss constant L, for each of the contributing stations, to the number of $n$ stations.

The meaning of Equation I is that when the contributed power supplied by station (1) is raised by an incremental amount, and the contributed powers of all of the other contributors are held constant (the various delivered loads all being increased by a fixed small percentage), the constant $C_1$ for such contributing station will be of the value expressed by Equation I, the value $F_1$ for such station (1), at the power then being delivered by said station, being known. If now the contributed power from station (1) be restored to its previous value and held constant at such value, and the power contributed by station (2) be raised by an incremental amount, the contributed power of station (3) being held constant (any slight adjustments of the various loads on the network being made so that each of them is raised by the above mentioned fixed small percentage), then the constant $C_2$ for such contributing station will be of the value expressed by Equation I. In like manner a constant $C_3$ may be obtained for the station (3), and for each of the other contributing stations to the number $n$.

In making the foregoing adjustments to determine the value of C for each station the incremental values $F_1$, $F_2$, $F_3$, ... $F_n$ will be known for the powers said stations are contributing, from performance curves or data prepared in advance. It is also noted that the values of F are incremental values of a character well known in the arts of power generation and distribution.

The following is given by way of example, as a simple procedure in the manipulation of the miniature network elements, to determine the values of C for the several contributing stations: it being assumed that the calculating table includes units representing generators, loads, and lines. These are built to simulate the corresponding elements of the real system being simulated. The loads are adjustable both as to megawatts, and megavars, leading or lagging. For easier adjustment these are calibrated at nominal voltage. Provision is made for reading the watts and vars, and where an exact adjustment of the load is required, this can be done. The generator voltages can be adjusted as to magnitude and phase with provision for measuring real and reactive outputs.

Each network section consists of simulating resistance and reactance elements. Each network section is provided with a transformer and varistor network whereby the equivalent network section loss is converted to a D. C. voltage which is proportional to such section loss. Provision is made whereby the D. C. loss representing voltages from all net-work sections may be totalized, thereby permitting the operator to determine the total network loss of the system.

Under any stated system operating condition the load dispatcher or other authority knows, at least to a close approximation, the following:

(a) The generating equipment available at each contributing station.

(b) The incremental fuel cost at each contributing station, a quantity which varies with the load carried by that station, the equipment available in such station, and prevailing unit cost of fuel at that location.

(c) The real and reactive load at each major load center and the range of voltage which must be maintained at each such center.

(d) The transmission circuits available.

(e) To a first approximation, based on the judgment and experience of the operator, the division of load among available contributing stations which will provide reliable service at reasonably low fuel cost.

The operator sets up these system load conditions on his calculating table, including those transmission circuits which are available. He adjusts the load at each load center to correspond to the known conditions and divides both the real and the reactive loads among the contributing stations as his judgment indicates they should be divided for best overall performance. He checks the voltages at the load centers and makes such voltage adjustments at the contributing stations as may be necessary to bring all load center voltages within acceptable limits.

The operator then increases the load on one contributing station by a small amount. This is accomplished by changing the apparent impedance at each load approximately one-half percent. The outputs of all other contributing stations are maintained constant. From the instruments provided the change in total system losses resulting from this small increment in loading is read. The ratio of the change in system losses to the change in station load is the incremental transmission loss for that station at the specified system load condition, and is indicated by $L_1$. Similar ratios are found for each contributing station in sequence, the original condition being restored after each reading. This series of readings provides the several incremental loss constants $L_1$, $L_2$, $L_3$ ... $L_n$, one for each contributing station.

Since the operator now knows the increment values $L_1$, $L_2$, $L_3$, ... $L_n$, (of Equation I), and since he also knows, from his available performance curves for the various contributing stations, the values of $F_1$, $F_2$, $F_3$, ... $F_n$, for said contributing stations, at the powers they are carrying, he now has available all data needed to solve for $C_1$, $C_2$, $C_3$, ... $C_n$, for the various contributing stations, under the division of total supplied power which constituted his first assumption or try.

Evidently the results of the first test of division of total power between the contributing stations will show values of C's which are unequal by amounts dependent on the closeness of the first assumption to the value of C for equality of all C's. Based on the results of the first assumption and test, the operator will re-divide the total power, increasing the contributions of some stations and decreasing the contributions of others, but maintaining the total contributed power sufficient to satisfy the load demands of all of the loads on the network, at the specified voltages. Having made such a re-division the operator will again go through the various steps, readings, and computations and determinations, outlined previously herein. As a result he will now have a new set of the values of C. These will probably be more nearly equal to each other, depending on the correctness of the operator's judgment in making the re-division. Thus the operator will go through several successive re-divisions, calculations, and determinations, increasing the powers supplied by stations having low C's and correspondingly reducing the powers supplied by stations having high C's, according to his judgment. These changes, tests, and calculations and determinations will be continued until finally the operator obtains what he considers to be a satisfactory division of the total power requirements among the several contributing stations. This condition will occur when the C's are all of substantially the same value.

It is not always possible to attain the theoretically most economical division. It may be necessary to employ some portion of the generating capacity of some highly economical station to supply reactive in order to maintain voltage at some given load center within acceptable limits, or any one of several other practical considerations may restrict the system to something less than the most economical division. Again, the revision of power division in the direction to bring the C's closer to equality may result in a voltage condition or other situation which would not be acceptable operating practice. Or, again, the re-divisions of supplied powers may indicate a further re-division to increase the power already carried by one station to a still higher value and to a value which would be unacceptable, either on account of overloading, elimination of reserve capacity at such station, or other limiting factor. But the equipment herein referred to and presently to be disclosed in detail, is capable of duplicating the system performance under any assumed conditions of division which the operator proposes to make, before ordering any readjustments of either supplied power or bus voltage at any station.

Fundamentally the calculating board includes the elements of network sections already mentioned. These include means in connection with each network section to produce a D. C. voltage which is linearly proportional to the loss occurring in such section, notwithstanding that the loss is essentially a parabolic function of the current value, since the principal loss is an $I^2R$ loss. One means whereby the production of such D. C. voltage directly proportional to the section loss may be attained is disclosed in our co-pending application for letters patent of the United States, Serial No. 346,928, filed by us April 6, 1953. In that application we have shown circuit arrangements whereby the section losses of all or any selected group of network sections may be automatically totalized by properly connecting the D. C. loss indicating terminals in series additive connection, together with means to indicate or otherwise make useful for computation purposes the total losses of all such network sections. In that application we have also shown wattmeters or other power measuring elements in connection with the several contributing stations to indicate or otherwise make useful the powers being supplied by such stations.

The test operations already described to enable determination of the values of C for the several contributing stations, for any assumed division of the total power requirements should be based on small or incremental changes of the powers supplied by the several stations. Such incremental power changes should be of the order of a small percent. The incremental changes of total loss obtained by summing the losses in the several network sections, will also be of correspondingly small percentages. In that earlier application we have disclosed means whereby the incremental indications or responses of the supplied powers may be very accurately determined and indicated or made useful for the needed functions. We have also disclosed means whereby the total loss incremental indications or responses may be very accurately indicated or made useful for the needed functions. Included in such previously disclosed means are provisions for producing a null indication at the condition of the original power or loss reading, together with means for multiplying the incremental change of power or loss by a multiplying factor of size sufficient to give a very close indication or determination of the incremental value based thereon.

Much of the so far disclosed elements of structure and modes of operation are also disclosed in our said earlier filed application, Serial No. 346,928; but the same have been presented here in form and arrangement and brevity to enable a better and more accurate understanding of what we shall now disclose, as follows:

The steps of operation above outlined for determination of the optimum division of total required power between the several contributing stations include (1) The connecting together of the several miniature network sections to simulate the corresponding real network sections and the connecting of the several current supply sources into such simulating network at points to correspond to the points of power contribution by the contributing stations.

(2) The adjustment of each simulating network section both as to resistance and reactance to correspond to the like qualities of the real network section.

(3) The adjustment of each simulating network load to correspond to the real network load.

(4) Adjustment of the vector voltages of the points of power input by the contributing stations to values above the potential of the common return, such that the total load specified as the total of the various useful loads shall be satisfied, while at the same time producing a division of said total load between the several power contributors according to what the operator has assumed as a first try for such division of total power requirement on a basis to give the optimum economy of operation.

(5) A typical set of operations incident to obtaining the value of $L_1$. These involve (a) The changing of the apparent impedance of each load (as by the use of an autotransformer) so as to increase the net power absorbed by such load in such degree that the net powers of all of the loads remain proportionately the same as before such increase. Thus all of the loads are increased by the same percent.

NOTE: The value of $F_1$ is found from examination of the incremental cost curves for station 1, at the power output condition under which that station is contributing its portion of the load.

(b) Examination of the wattmeters of all of the stations other than station 1, to be sure that their power outputs (contributions to the network) have not been increased by the adjustments of "a" above; and the making of any needed corrections at various points to restore each of the stations other than station 1, to its original power output if any departure from its previous power output has occurred.

(c) The reading and determination of the increment of power contributed by station 1, by reason of the adjustments produced according to (a) and (b), above. This increment of power is determined by use of the incremental wattmeter of station 1. It will be designated $\Delta P_1$.

(d) The determination of the increment of the total losses produced by the increment of the power supplied by station 1. This is determined by use of the incremental loss meter. It will be designated as $\Delta L_1$.

(e) The restoration of the power output of station (1) to its former value by restoration of the entire network to its original condition.

(6) A sequence of the adjustments and operations stated in (a), (b), (c), (d) and (e), above for each of the other contributing stations, together with corresponding determinations of $\Delta P_2$, $\Delta L_2$, $\Delta P_3$, $\Delta L_3$, ... $\Delta P_n$ and $\Delta L_n$, and the observation or noting of the values of $F_2$, $F_3$, ... $F_n$, corresponding to the power contributions of the several stations. These latter are found, as before stated, by reference to the incremental cost curves for the said contributing stations.

(7) Having in hand the data above stated, from the series of tests recited, it is possible to determine the values of the C's for the several contributing stations, under the division of loads obtaining during such set of tests. First it is necessary to determine the value of L for each station, based on such obtained data. Now (II)

$L_n = \Delta L_n / \Delta P_n$, or, stated otherwise, $L_n$ equals total loss at raised system output minus total loss before raising the system output, divided by increase in output of the contributor "n."

(8) Having determined the L's according to the above explanation, it is possible to determine the C's for the assumed division of total required power between the contributors.

The data and determinations outlined above enable the operator to appraise the re-division of total required power between the several contributors, with the objective of reducing the inequalities between the several C's for the stations. Probably several trys of divisions between the stations will be required before the operator accepts the final result as indicating a practically sufficiently accurate determination to meet his needs or judgment. Each of this series of trys is time-consuming, and requires some simple mathematical determinations, as well as reference to the incremental cost curves for the stations to ascertain the values of F to be used in each set of determinations. Furthermore, it is the objective of the set of trys and determinations to ascertain the most economical division to be put into effect for a stated set of load conditions. If such stated set of load conditions constitute an anticipated loading not yet in effect, the time element may not interfere with actually using the finally determined division advantageously. If the stated set of load conditions is in effect at the time of making the determinations it is evident that full benefits of such determinations may not be obtained, since an operating condition will obtain during the time needed to make the determinations, and if that operating condition is not the optimum possible condition it is evident that much of the value of the determinations will be lost.

The time element required for making the determinations based on the required observations is considerable in the case of networks carrying numerous loads, and especially when more than two or three stations contribute power into the system. In fact, the increase in time required is somewhat according to a geometrical progression proportioned to the number of the contributors.

A prime object of the present invention is to provide means to greatly simplify the operations attendant on the determinations of the values of the L's for the several power contributors at each of the successive divisions of total power; and, based on such determinations of the L's, to provide means to quickly determine the values of the C's for such assumed divisions of total contributed power. We have provided means to automatically determine or evaluate the L's of the several power contributors, and means to automatically determine or evaluate the C's of the several power contributors, for any assumed division of the total required power between the contributing stations.

Since the determination or evaluation of the C for any station requires a foreknowledge of the value of F for such station at the power delivery contributed by it, we next consider the factors entering into the determination and useful application of such factor F for each station in making the determination and/or use thereof to obtain the desired C.

Generally each contributing station includes two or more prime mover driven generators. For each of these, together with its steam generating equipment, auxiliary equipment, etc., there may be plotted an incremental cost or rate curve showing the incremental cost of power delivered to the busbars or other point of delivery for such station unit. These incremental cost curves show widely varying values between the minimum and maximum loads which such unit is intended to carry. Frequently these curves are non-linear, being usually concave upwardly. Frequently the incremental cost curve for a unit will include one or more sudden steps caused by the effects of bringing into use or cutting out of use or service, additional nozzles of the turbine steam supply system, or other operational conditions.

It is apparent that the value of F for a given station will depend, not only on how much power is being contributed by such station, but also on which generating units are then on the busbars or other point of delivery. For any selected combination of units there may however be plotted an overall incremental cost curve representing the incremental costs for all station power outputs within the range of powers intended to be delivered by such station with such units in service. It is also evident that each station may be found to have as many overall incremental cost curves as there are possible combinations of its generating units. It is thus evident that proper account must be taken of what generating units are in service or to be in service at each contributing station in order to use the proper incremental cost curve applicable to the operating conditions assumed to be in effect. If the determinations for finding the C's are to include processes involving manual or personal observations and computations, use may be made of that incremental cost curve which corresponds to the units known or proposed to be delivering energy. If the determinations are to be automatically effected, provision must be made for ensuring operations which shall correspond to those units known or assumed to be delivering energy and power to the network; the automatic equipment must be provided with means to select and use those factors which shall correspond to the determinations of F for such station on the basis of the units assumed to be delivering the power. We have herein included all such means and will disclose the same hereinafter.

The means hereinafter disclosed for determining the value of F for each contributing station under the power output which it is contributing to the network includes provisions for taking account of the incremental cost curves for the units assumed to be in service, regardless of the forms of such curves—whether they be straight lines or curved, concave upwardly, or whether they include points of discontinuity with sudden changes of incremental cost value already referred to. The equipment includes simple switching means whereby the operator may bring into operation those elements which shall ensure delivery of signals or current values to other elements of the equipment on the basis of the overall F value of such station at the condition of loading in effect during the tests and determinations.

Each generating unit of a station has an acceptable range of power delivery between minimum and maximum values. Accordingly, as the demand for power from a contributing station rises, with corresponding necessary increase of power delivered by each operating unit of such station, a condition eventually will be reached when any given unit should not be required to deliver greater power. Any increase of power demanded of such station should then be assumed by other units which have not yet reached their acceptable high power delivery values; but the division of such increased power among such other units should be on a basis to conform to the already stated principles. A similar control should be exercised during reductions of power demanded from such contributing station. We have provided means to automatically limit the power deliveries from the several units at both maximum and minimum acceptable values, thus holding each generating unit within that range of delivered power which is acceptable for such unit's operation. Such means will be disclosed hereinafter.

We have also included, in the disclosures to be hereinafter described, means to automatically and substantially without delay, determine the value of L for each station, under the conditions then obtaining on the network, and for the division of total power then under test; and have provided means to correlate such value of L with the other factors of the problem of determining the value of C for such station under such operating conditions.

We have also included, in the disclosures to be hereinafter described, means to automatically, and substantially without delay, determine the value of C for each contributing station under the operating conditions then in effect, and under the division of power assumed to be in effect.

The present disclosures include means to visually indicate the values of C for the several contributing stations, for each assumed division of total required power, so that for each assumed division of power the amounts of inequality between the C values may be at once seen, and, based on such inequalities, the operator may quickly determine in what direction, and to approximately what degree, changes in the division of total power should be made in order to bring the several C's more nearly into equality. Thus, when using features of our present invention in connection with semi-automatic determinations of the optimum division of power, practically all manual operations are disposed with, and the operator is promptly supplied with information on which to base his further estimated changes of division of the total power requirements.

The present disclosures include an interrelation of various elements for determining the F's and the L's for the several contributing stations such that for any selected division of the total power requirements the several elements of the equipment will go through necessary tests and adjustments of their parts to quickly determine and indicate or evaluate the values of the several C's corresponding to such selected or assumed division of the total power requirements. We have, as a further feature of our present disclosures, also provided means whereby as the several C's for the stations are determined or evaluated, additional units of the present equipment are caused to function so that the power contributed by each station of the simulating network shall be automatically re-adjusted by a small percent (if such re-adjustment is necessary to bring about the equality of the C's), such re-adjustment being as an increase of the power contributed by each station showing a lower C than other stations, and as a decrease of the power contributed by each station showing a higher C than other stations. This unit of the equipment, when provided, is conveniently operated on a sequence basis, by a cycling operation, so that the C's corresponding to the several stations are all checked in regular fashion, and the contributed powers are corrected, either up or down or not at all, as needed, until finally the C's for all of the stations are brought into substantially the same value.

It is also evident that as the total load on the network increases the power contributions from the several stations will be increased according to the principles already explained. Since each station can acceptably carry only a specified maximum power we have provided means in connection with the equipment already referred to, to automatically limit such station to the acceptable maximum power which it should carry, and also means to automatically limit such station to the acceptable minimum power which it should carry.

With the foregoing referred to means, whenever a condition of inequality occurs between the C's for the several stations on the network, the equipment will determine what changes of division of the then total power requirements must be made in order to restore such C's to the desired condition of equality. Such a condition of inequality may be caused by any one of several disturbing conditions on the network. These disturbing conditions may include changes in the distribution of the loads carried by the network, or changes of the total load carried by the network, or combinations of both such kinds of changes. Our present equipment will automatically determine the inequalities in the values of the C's as such loading changes occur, and will proceed to determine the new division of load between the contributing stations, to again bring the C's into a condition of equality as desired.

The settings of load values, etc., or the changes of points of loading on the network will be communicated from actual load locations to the location of the simulating network. There the operator of the calculating table may manually make corresponding changes on said calculating table. Or, if desired, suitable remote controls, such as telemetering devices may be provided between the actual load centers and the load simulating elements of the calculating table to enable automatic setting and changes of the simulating elements of the miniature network in harmony with the changes occurring in the real network. When automatic equipment for effecting corresponding changes in division of load between the contributing stations is also provided, the calculating table is fully automatic. We have herein disclosed the means to effect these results.

Provision may also be made by suitable telemetering or like equipment controlled by the calculating table, together with servo-operated controls at the generating units of the several contributing stations, for automatically varying the throttles and control elements of the generating units from time to time, to cause the real generating units of the several contributing stations to vary their power outputs according to the determinations effected by the calculating table for most economical delivery of the total power requirements. We have herein disclosed such equipment.

The calculating tables herein disclosed may be used for the solution of numerous problems related to power distribution and transmission, as well as problems directly related to the determination of the most economical division of total load between several or many power contributors. By way of example only, the following uses are briefly stated:

Let it be assumed that a given network is delivering a total of 200 mw. at certain stated load centers and from certain power contributors feeding into the network on a power division ensuring the most economical power delivery to the load centers. Under these conditions the station operating costs are known or computable, and the line loss data can be ascertained, so the cost of the 200 mw. delivered power can be determined. Then assume that another power consumer desires to buy 50 mw. of additional delivered power from the same network at a specified delivery point. This additional load may be placed on the simulating network, still delivering the original 200 mw., and a new solution may be made of the most economical total load division between the contributing stations. The new power supply from each station is now found, the corresponding unit costs for the several stations are known, the new line loss is determined during the making of the new solution. The difference in total cost of the delivered 250 mw. as compared to the cost of the original delivered power, is chargeable against the new customer.

As another example, assume a network is delivering 200 mw. at a number of points and is supplied by three contributing stations. A solution is made to determine the most economical division of total power between the three stations. The network losses are determined during this solution. Now assume that another power system desires to trunk 50 mw. through the network from one point of power entry to a remote point of power delivery. This added 50 mw. is fed into the simulating network at the proper point of infeed, a like amount of 50 mw. is taken from the simulating network at the proper point as a new load, and then the three original stations are readjusted to obtain the division of power between them to provide for the supply of the original 200 mw. of usefully delivered load, plus the total network losses under the new conditions, and with the most economical division of power supply between the three original contributors. The new network losses are determined during this operation. The total cost of delivering the 200 mw. under the new loading, as compared to the cost of delivering the same under the original loading is a measure of the cost of trunking the 50 mw. through the network.

It is noted that the foregoing solution of the problem of trunking power through the network was based on the assumption that the power input of the other power system was exactly the same as the power delivered for such power system at its delivery point, namely, 50 mw. On this assumption any network losses due to the trunking operation were carried by the stations previously on the system, none of such losses being added to the power supplied into the system by such other power company. A different solution of this same problem would be one in which the new point of power infeed of the other company would be considered as an additional power contribution point, and the solution of the problem would be made in such manner that the most economical division of power among all of the contributing stations, including such new point of input, would then be made. Under this solution of the problem a portion of the network losses would be thrown onto such trunking company, so that its contribution would actually be more than the assumed 50 mw. by such amount as indicated by the final solution of the problem. In making this solution of the problem the incremental costs of such other company's power would have to be known, and properly applied during the solving of the problem.

We here disclose structures of a computing device which computes from input data provided, the actual incremental cost of delivered power from each source supplying power to the system. The structures herein disclosed differ from prior art structures known to us specifically in that our structures either receive as direct input data, or actually compute from data supplied to them, current magnitudes of all significant parameters in substantial agreement with existing actual system conditions; in contrast with earlier structures in which some of these parameters are pre-computed and are substantially fixed in the constructions of the devices.

At this point we note that in its more complete aspect our present invention includes the disclosures of the various elements and units of equipment, combined together in proper and orderly manner to make the complete determinations of the values of C for the several contributing stations, under the condition that the most economical division of power requirements between the contributors is to be made. It is now noted that in these disclosures and procedure we have also provided means to automatically carry forward, step by step, the various operations needed to make the determinations of the values of C for the stated purposes. During these operations certain intermediate data and determinations and indications are also made. Some of such intermediate data and determinations and indications are of great value in analyzing network and station operations, and in making useful comparisons of costs and other operating factors under various changes of loading, divisions of power contribution, and other changes.

Accordingly, we do not intend to limit the claims to the complete combination of elements and units needed to determine the C's for the various contributing stations, nor to the provision of means to automatically compare the values of said C's, nor to the means to automatically produce re-divisions of the total power requirements among the several contributing stations, except as we may limit ourselves in the claims to follow. On the contrary we also contemplate as being within the scope of our invention and the protection of various of the claims to follow, the combinations of various elements and units, combined and related together in proper manner to facilitate the determination or indication of various data by automatic operations for further or subsequent useful application of such data in the final determination of the most economical division of the total required power between the various power contributors, or for the useful application of such data to other objects and uses and purposes in connection with the study and analysis of power distribution networks.

Other objects and uses of the invention will appear from a detailed description of the same, which consists in the features of construction and combinations of parts hereinafter described and claimed.

In the drawings:

Figure 1 shows diagrammatically a simple network supplying four loads, power being supplied by three contributing stations, and this diagram also shows the network section losses schematically;

Figure 2 shows diagrammatically the network of Figure 1, but it shows the loads as being adjustable in amount, together with a simple means to simultaneously adjust all of the loads by incremental amounts so that after such adjustments the loads are proportionately of the same relation as prior to such adjustments; and this figure also indicates schematically the several losses of the network sections connected together in series, together with means responsive to the losses and whereby incremental changes of total loss for the network sections may be determined; and this figure also shows schematically incremental wattmeters for the several power contributors, so that incremental changes in the powers of the individual stations may be determined;

Figure 3 shows typical incremental cost curves for four generating units of a station, one curve being of form including a discontinuity, one curve being of form which is concave upwards, one curve being a straight line, and the fourth curve being of form including two discontinuities;

Figure 4 shows the incremental cost curve for the station whose generating unit cost curves are shown in Figure 3, for the condition that generating units 1, 2 and 3 are in operation, the curve of Figure 4 being prepared on the assumption that the three generating units which are in operation are so loaded that their individual incremental costs are all the same for any given station load; provided, however, that controls are provided to limit the outputs of generating units Nos. 2 and 3, and that the station incremental curve shown in Figure 4 takes account of such limitations;

Figure 5 shows by block diagram the network, contributing stations, loads, and network section losses of the network shown in Figures 1 and 2, together with the principal elements for effecting necessary measurements and controls for a miniature reproduction of such network under various loading conditions, in order to determine the optimum division of the required power to supply the loads at minimum cost, and according to the principles herein disclosed; and this figure also shows, schematically, central control means whereby the changes of loads, controls of station outputs, and other controls, as well as the determinations of the values of "C" for the several contributing stations may be determined for any selected division of total power requirements between the stations; and this figure also shows, schematically means whereby the determinations of the values of "C" for the several stations may be automatically progressed from station to station for all of the contributing stations, for the entire network system, together with means to correlate the "C's" so determined in order to determine the changes of division between the various stations to bring the various "C's" more nearly into equality; and this figure also shows, schematically, means to automatically effect correctional changes in the division of total power requirements between the several stations, to improve the division of total power, and to bring all of the "C's" closer to a condition of equality;

Figure 6 shows, by simple wiring diagram the elements shown in Figure 5, together with certain additional elements to effect the operations and obtain the results hereinbefore referred to;

Figure 7 shows certain of the units for a contributing station, together with other units which are used successively in connection with the units of the several stations, to determine the values of "C" for the several contributing stations, it being understood that in the complete simulating network there is provided a set of the contributing station units for each contributing station, and a single set of the other units which are used successively in connection with the units of the several stations, together with means to integrate the units of such single set progressively with the units of the several stations to determine the "C" values for the several stations in selected order;

Figure 8 shows, in section and perspective, one form of comparison unit for comparing the values of "C" for the several stations under a selected division of total power requirements, and for automatically determining which station is operating with the highest "C" value, and which station is operating with the lowest "C" value, and for automatically signalling to such two stations corrective signals, acting through proper control units, to make such corrections in the division of power as shall probably result in bringing the "C" values of all of the stations more nearly into equality with each other; the comparison unit shown in this figure being provided with contact elements and other parts needed to effect comparisons between four contributing stations operations;

Figure 9 shows a section taken substantially on the line 9—9 of Figure 8, but not in perspective; and this figure also shows the means whereby a contact or contacts for any selected station may be moved into non-operative position by a signal or signals received from the proper control element, corresponding to either a high power limit or a low power limit of power to be contributed by such station;

Figure 10 shows a fragmentary section taken on the line 10—10 of Figure 9, looking in the direction of the arrows, and it shows a face view of one set of the contacts which are shifted to correspond to the determined value of "C" for the station corresponding to such set of contacts;

Figure 11 shows a fragmentary section taken on the line 11—11 of Figure 9, looking in the direction of the arrows, and it shows the opposite faces of the contacts referred to and shown in Figure 10;

Figure 12 shows a fragmentary portion of a wiring diagram and illustrates one arrangement for effecting control of the power output of one of the contributing stations;

Figure 13 shows a vector diagram illustrating the relation ship between certain of the electrical quantities of the circuit shown in Figure 12;

Figure 14 shows a block diagram of a power control arrangement for one of the contributing stations, embodying the features of the arrangement to which figures 12 and 13 refer;

Figure 16:
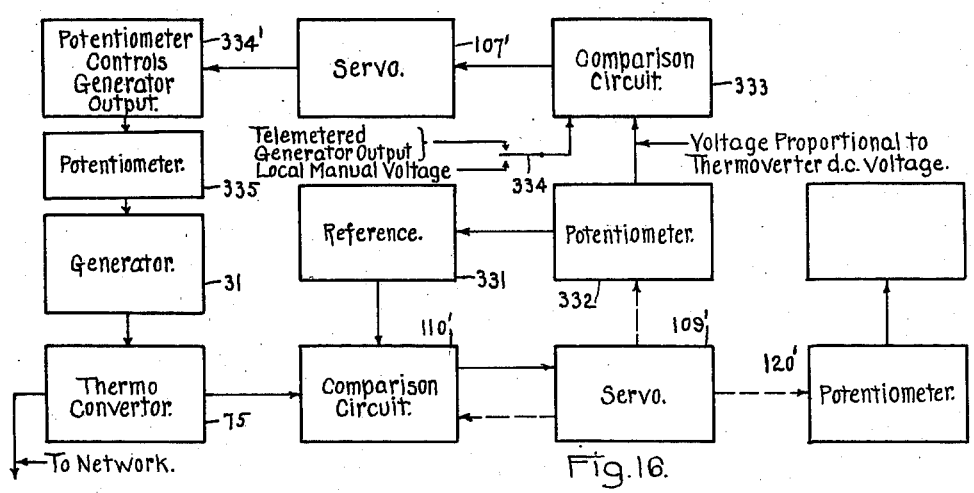
Figure 17:
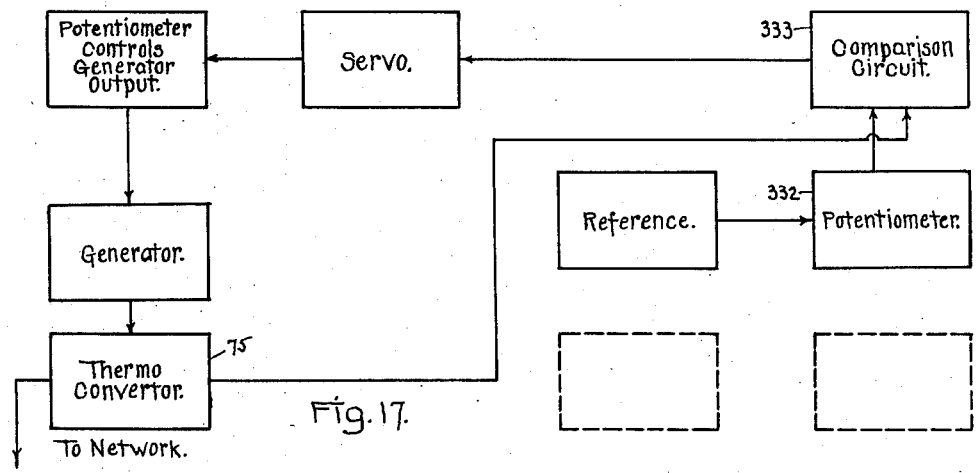
Figure 18:
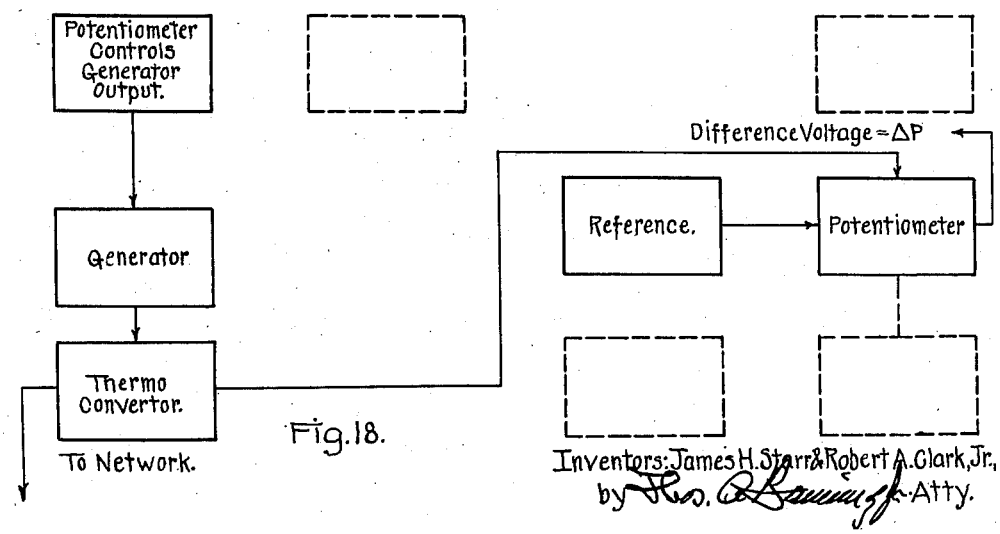

Figure 15 shows a wiring diagram of one form of unit for determining the loss occuring in a network element, and for translating the value of such determined loss into a D. C. voltage which is directly proportional to the amount of such network element's loss; and this form of loss determining circuit arrangement is also disclosed in our co-pending application, Serial No. 346,978, filed April 6, 1953;

Figure 16 shows by block diagram a modified or substitute arrangement of one unit or set of elements which is of characteristics such as to very accurately match a computer generator or computer generators to the actual generator output;

Figure 17 shows a block diagram of a modified or substitute arrangement of one unit or set of elements which is of characteristics such as to very accurately hold a generator output constant; and Figure 18 shows by block diagram a modified or substitute arrangement of one unit or set of elements which is of characteristics such as to very accurately hold the generator phase position fixed and enable accurate determination of the value of ΔP, previously referred to herein.

Figures 1, 2:
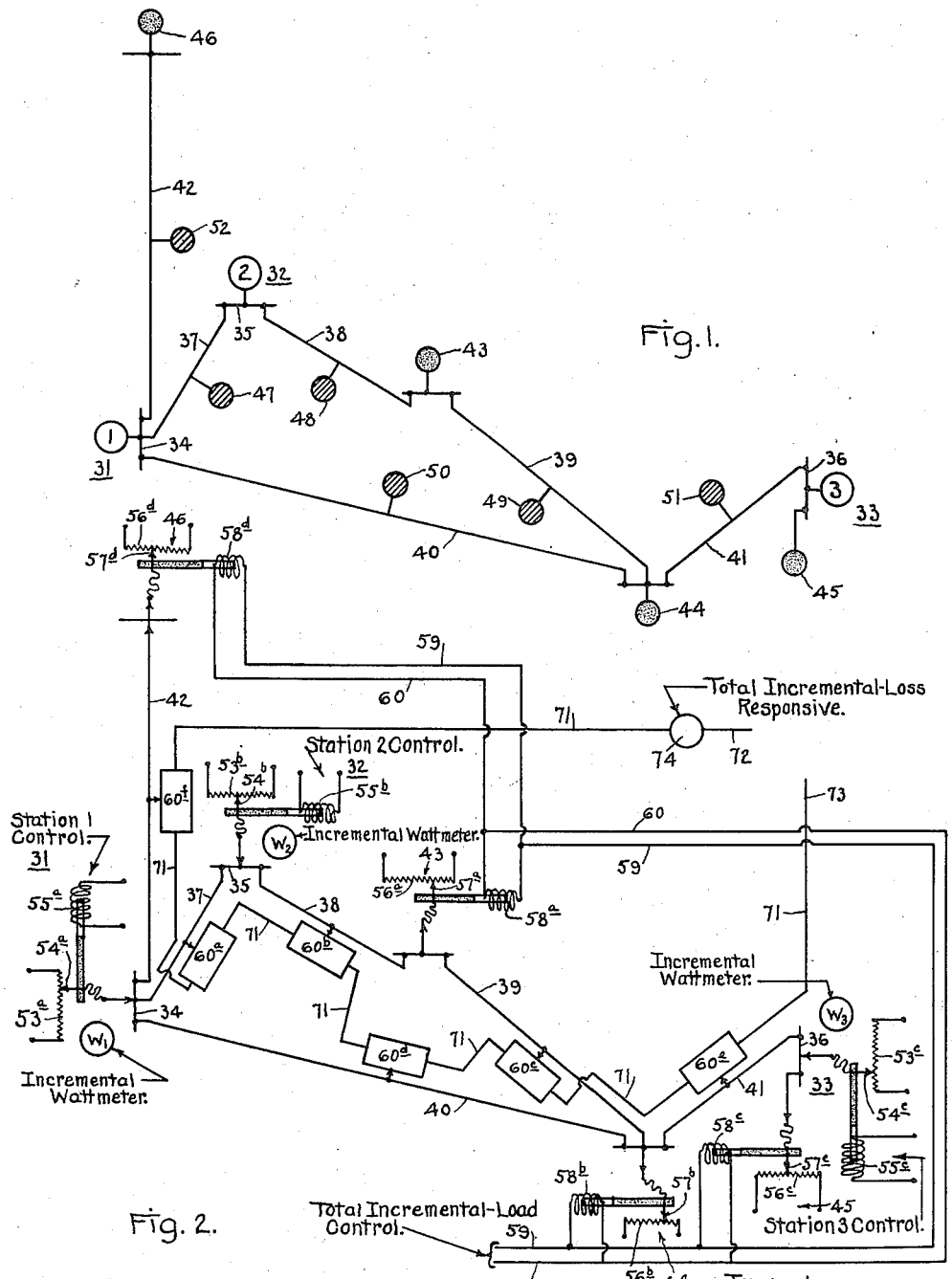
Figure 5:
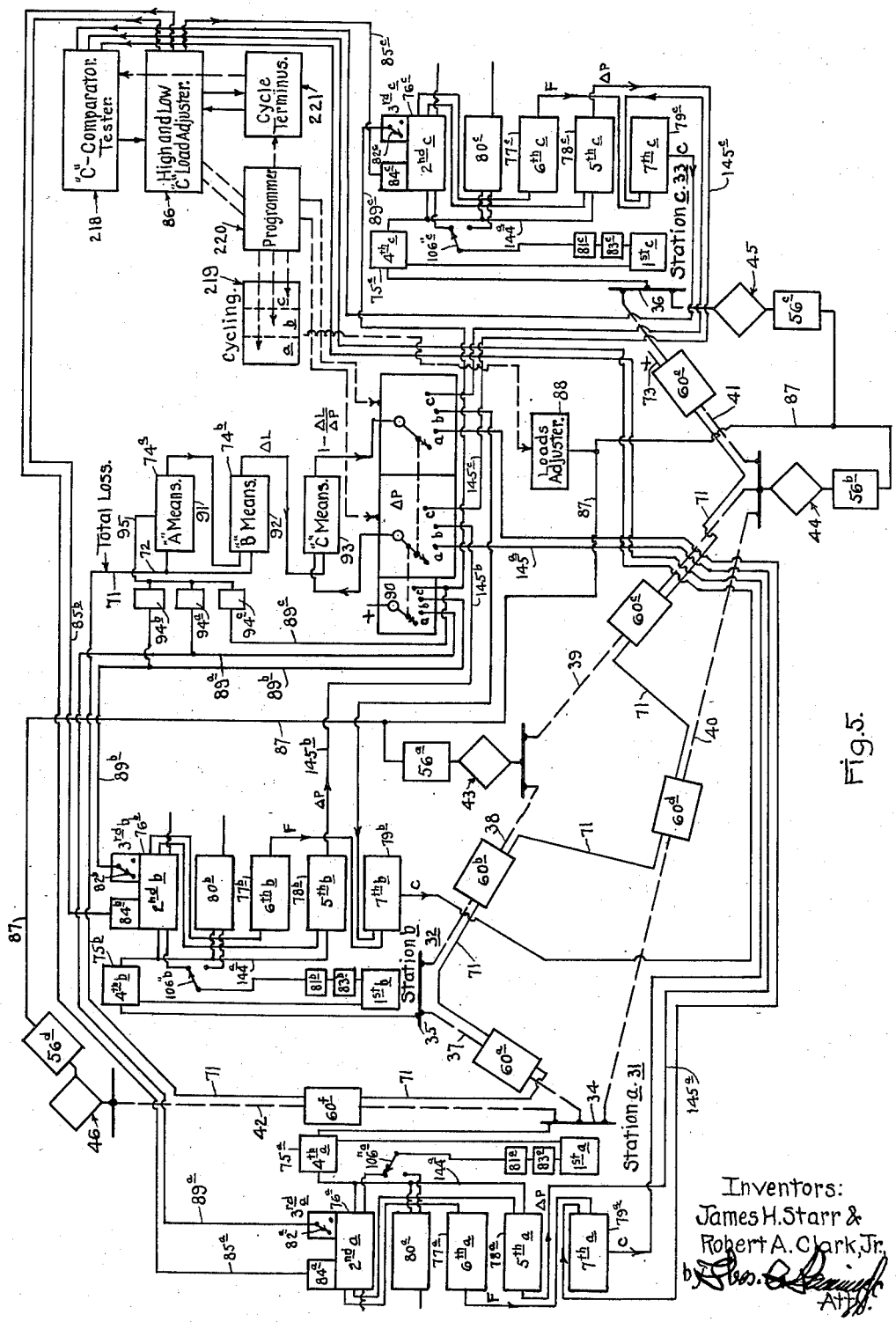

Referring first to Figures 1, 2 and 5, we have therein shown a system including the three contributing stations 31, 32 and 33 feeding, through the busbars 34, 35 and 36, into a network. This network includes the sections 37, 38, 39, 40, 41 and 42, to which are connected the loads 43, 44, 45 and 46. Actually, the load 45 is shown as being directly fed from the busbar 36 of the station 33, but since such load affects the total load on the system it must be considered in our studies. Likewise, the load 46 is directly connected to the station 31's busbar, but over a considerable network section 42; but this load, too, must be considered. The network losses in the various sections are indicated at 47, 48, 49, 50, 51 and 52, it being noted that no loss indication is shown for the connection of the load 45 to the busbar 36 as it is assumed that this is a direct connection of the busbar to the load.

In Figure 2 we have indicated, schematically, means to adjust the output of each contributing station by the adjustable potentiometer including the element 53, the slidable contact 54, and the operating solenoid 55 for each station. Conveniently these elements are shown with the suffixes "a," "b" and "c" for the three stations. Other means may be and is actually provided to secure the adjustments of the station outputs, as will appear hereinafter. It is noted that these output adjustments are shown as being individual to the several stations, so that the adjustments of the stations may be made independently of each other, although from either a near or a distant location.

We have also indicated, schematically, means to adjust the value of each load by the adjustable potentiometer including the element 56, the slidable contact 57, and the operating solenoid 58 for each load. Conveniently these elements are provided with the suffixes "a," "b," "c" and "d" for the four loads. Other means may be and is actually provided to secure the adjustments of the loads, as will appear hereinafter. It is noted that these load adjustments are shown as being connected together by connecting all of the solenoids in parallel across the lines 59 and 60, to whose terminals may be connected suitable load adjusting or varying means. It is also noted that by this means all of the loads may be adjusted as a group to simultaneously raise and lower their values. It is, however, contemplated that the means to determine the load values may be by use of auto-transformers for the individual loads, with tapped primaries, whereby, by shifting all of the tap connections by equal amounts all of the loads will be varied by such amounts that they all retain, after such variations, the same relative values or load amounts. It is also understood that each load may be individually adjusted as to its normal value, to represent the actual load which it simulates. To this end each load element may be provided with a tapped secondary, so that its load wll be determined by the tap selected for use. Nevertheless, with this arrangement, by shifting the primary connections of all of the load simulating auto-transformers an equal tap amount, as for example, one tap connection position, all of the loads will be changed by equal percentage values, and all will therefore be of relatively the same amounts as prior to such shift. Also, after a test has been made, all of the primary connections may be restored to their original positions, thus returning all of the loads to their original values.

In Figure 2 we have also indicated schematically, by a small rectangle adjacent to each network section, a loss determining element for such section. These are the elements $60^a$, $60^b$, $60^c$, $60^d$, $60^e$ and $60^f$. Each of these elements is of such construction that it delivers a force or reaction directly proportional to the loss occurring in its section. In our aforesaid application, Serial No. 346,978 we have disclosed loss determining elements responding to the above requirements, and such an element is also disclosed, by way of example only, in the present application, Figure 15. It includes the small resistance element 61, preferably adjustable, comprising a portion of the resistance simulating quantity of the simulating network section; and the primary 62 of a small transformer 63 is connected across the terminals of this resistance element 61. Thus there is produced in the secondary 64 of such transformer a potential proportional to the current flowing through the network section. A bridge 65 having varistors 66 in its four branches has two of its diagonally opposite corners connected to the terminals of the transformer secondary 64, and its other diagonally opposite corners are connected to the capacitor 67 across which is connected the potentiometer 68. The leads 69 and 70 from this potentiometer then comprise D. C. terminals of the unit. It can be shown that with such an arrangement, operating under proper limits of high and low current values through the resistance 61, the D. C. potential between the terminals 69 and 70 will be directly proportional to the I²R loss in the simulating network section, assuming that substantially all the section loss may be fairly represented by such I²R value, which is substantially true. We have shown all of these units 60ª to 60ᶠ as connected by the lines 71 with their terminals 69 and 70 in series additive arrangement, so that the total D. C. potential delivered between the ends 72 and 73 of such series group is directly proportional to the total network loss of all sections contained in the series grouping. In Figure 2 we have also indicated the unit 74 designated as "Total Incremental-Loss Responsive." We shall hereinafter make further extended reference to the use of the total loss and the incremental loss factors and values in connection with the purposes and objects attained by the present invention, and the means herein disclosed for their attainment.

Corresponding to each power contributing station we have provided means to perform the following functions: First, means to simulate a power output or supply to the network at the point corresponding to the supply by such station. This means is adjustable by incremental amounts; second, means to adjust the power supplied to the network by the above unit, and to hold such adjusted power amount accurately to its adjusted value, and to deliver an indication or signal corresponding to such adjusted value. This value is designated as P; third, means to make ineffective the means to hold such adjusted power amount so that the power supplied by first unit may change (generally increase) to meet a future condition imposed during the tests, while leaving said indication or signal of second at its original value, P; fourth, means to accurately measure the power supplied by first, whether said power to be held at the adjusted value, P, or be of some other value when second is made ineffective as stated in third; and this measuring means conveniently takes the form of a unit delivering a D. C. potential directly proportional to the amount of the power being delivered to the network by first; fifth, means to accurately determine the differential between the originally adjusted power which is represented by the indication or signal, P, and the changed (generally increased) power referred to in third. This differential is designated ΔP; sixth, means to determine the value of F for the station in question, and under the load or power P being supplied to the network by such station at the held value of second; seventh, means to determine the value of "C" for the station in question, it being remembered that C equals F divided by 1 minus L where L equals ΔL divided by ΔP. We shall presently refer to the means whereby the value of L is determined, it being remembered that ΔL is a function of the losses in the entire network, and thus not determined by the units so far referred to in this paragraph. Such L determining means is thus not peculiar to any one of the contributing stations, but serves determinations of the values of "C" for each station in turn. The means to determine the value of "C" includes dividing means as is apparent from the form of the equation defining that constant.

One specific means to accurately measure the power as specified in fourth, above comprises what is known as a "Thermoverter, Model W–878" of The Bristol Company, Waterbury, Connecticut, and disclosed in Letters Patent of the United States, Nos. 1,407,147 and 1,456,591, such devices being described also in Sales Data Sheet No. 220 of said Bristol Company, dated March 1, 1940. We do not, however, limit ourselves to said device nor to devices of the same character as said device, except as we may do so in the claims to follow, but we contemplate the use and combination of any suitable power measuring device capable of meeting the requirements of the present problem, when combined with other units according to our disclosures herein contained.

One specific means to comply with the requirements of second, fifth, sixth and seventh, above, when modified to meet certain of the said requirements if necessary comprises what is known as "The Moseley D. C. Voltmeter, Model 20 Series" of the F. L. Moseley Co., of Pasadena, California and disclosed in Bulletin No. 7 dated March 1954. We do not, however, limit ourselves to said device nor to devices of the same character as said device, except as we may do so in the claims to follow, but we contemplate the use and combination of any suitable unit capable of meeting the requirements of the present problem, when combined with other units according to our disclosures herein contained. It is here noted, further, that such devices as said Moseley device may be modified in details to meet specific requirements of a given problem. Certain of the units already referred to include such modifications, as will presently appear. It is also noted that such device when used as fifth above is used as a means to determine the difference between two values, and that such device when used as seventh above is used as a means to determine the quotient of a dividend divided by a divisor. These specific uses of such units are and may be attained by proper connections effected within their confines.

Reference has been previously made to the conducting of tests in which each load on the network is increased by an incremental amount, with such increases for all of the loads effected by the same ratio, one, only, of the contributing power stations assuming the entire incremental load and any change of network losses thus required to be supplied; and then determining the incremental power thus required of such single station in comparison to the incremental loss thus occurring in the network, in order to determine the value of L as a basis for the additional determination of the value of "C" for such single station, the value of "C" having been shown to be equal to F divided by 1 minus L; and the conducting of similar tests for each of the contributing stations in turn. These tests require the provision of means whereby factors and values based on the entire network losses may be determined and processed and then delivered to units which are directly related to the station then under test. We have therefore provided means which is used to determine the values of total network loss before and after the raising of the loads by the incremental amount, and for determining the difference between such two values, and also for determining the quotient of the said difference divided by the difference in power contributed by the station in question after the raising of the loads by the incremental amount compared to the power contributed by such station before raising the loads. This last difference is the value determined by fifth, above, namely ΔP.

We have therefore provided means to perform the following functions: A, means to accurately determine and give an indication of the total loss value prior to the incremental increase, including means to hold such unit at its indicated loss determined value during a subsequent change (generally an increase) in the value of the losses; B, means to accurately determine and give an indication of the total loss value after the incremental increase, and for comparing such value with the value determined by A, to determine and give an indication of the difference between such two values; and C, means to compare the indicated difference of loss values determined by B with the difference, ΔP, between the two power values as determined by fifth, above, by a dividing operation. Thus, the means B above operates to determine the difference between two values, and the means C, above operates to determine a quotient.

One specific means to comply with the requirements of A, B and C, above, comprises the previously mentioned Moseley D. C. Voltmeter, Model 20 Series, but, as before stated, we do not limit ourselves to the said devices nor to devices of the same character, except as we may do so in the claims to follow.

Referring next to Figure 5 in particular, the generating stations are there shown at 31, 32 and 33. For each station we have provided a number of units as already explained. These include the power measuring means referred to as "first," and shown at $75^a$, $75^b$ and $75^c$, respectively, for the three stations. Hereinafter where convenient we shall use the suffixes "a," "b" and "c" for units which are directly related to the several stations, for ready identification of corresponding elements. We have also provided, for each station the units 76, 77, 78 and 79, and, if telemetered controls are to be used for certain operations, we have also provided the unit 80 corresponding to each station. These units 80, when provided, are similar to corresponding units 76, and will be referred to hereinafter.

Conveniently each of the power measuring units 75 is of the thermoverter type already referred to, and we do not deem it necessary to illustrate and describe such unit in particular detail, as units of this type are well known in the electrical and related arts. Likewise, each of the units 76, 77, 78, 79 and 80 is of the Moseley bridge type already referred to, and likewise we do not deem it necessary to illustrate and describe such unit in particular detail, as units of this type are well known in the electrical and related arts; but we have in certain figures shown, more or less schematically some portions of such units for clarity in understanding their use and operation in the present ensemble of parts. We shall hereinafter also describe modified or substitute units in place of such Moseley bridge type units, which may be used for the needed operations and functions, such modified or substitute disclosures being made by way of example, only. Interposed between the unit 76 (or 80) and the generating station 31, 32 or 33, as the case may be, we have also indicated the units 81, these being power control units which control the operations of the generating station simulating units 31, 32 and 33 to cause delivery of required power outputs into the network, but under control of the units 76 (or 80) as will be hereinafter explained.

The units 31, 32 and 33 are the First Means heretofore defined; the units 76 (or 80) are the Second Means heretofore defined; the Third Means heretofore defined comprises switching or like elements which may be actuated or functioned to interrupt the holding by such Second Means, of the adjusted power supplied to the network, so that although the signal corresponding to the adjusted power value (P) is still given, the power output delivered to the network by the unit 31, 32 or 33, as the case may be, may change as needed during the making of the tests already referred to. We have indicated such switching means at 82 for each of the units 76 in Figure 5, and a like switching unit may be provided for each of the units 80 when such unit 80 is provided. The Fourth Means heretofore defined comprises the unit 75 for each station; the Fifth Means heretofore defined comprises the unit 78 for each station; the Sixth Means heretofore defined comprises the unit 77 for each station; and the Seventh Means heretofore defined comprises the unit 79 for each station. Sometimes an additional control unit or element 83 may be included in the controls of the generators 31, 32 and 33, for special purposes, as will presently appear.

In Figure 5 we have also shown, schematically, the units 84 in connection with the units 76 (and 80, when used). These units 84 comprise remote control means for raising and afterwards lowering the controlled position of certain elements of the units 76 (and 80), to correspondingly cause incremental increasing or decreasing of the power output of the corresponding generator, 31, 32 or 33, as the case may be, during the group operations hereinafter explained, and for the purpose of causing redivisions of the powers supplied by the several contributing stations, to reduce the differences between the values of the C's for the various stations. In Figure 5 we have shown the lines $85^a$, $85^b$ and $85^c$ extending from said units 84 to a common control point 86 at the control station.

In Figure 5 we have also shown the means to adjust each of the loads 43, 44, 45 and 46, carried by the network, while retaining all of the loads at the same relative values as before such adjustment, and for afterwards restoring such loads to their respective original values. These means are shown at $56^a$, $56^b$, $56^c$ and $56^d$, for the respective loads. As already explained such adjusting means, although shown in Figure 2 in the form of potentiometers, may take the form of tapped transformers, with taps on both their primaries and their secondaries. In such an arrangement the shifting of the connections to the primary taps will accomplish the desired and intended results stated above. We contemplate the provision and use of such means when desired. In Figure 5 we have also shown, schematically, the line 87 connecting together all of the units $56^a$, $56^b$, $56^c$ and $56^d$. This line indicates a common control for all of the load adjusting means so that they may all be either raised or lowered the incremental amounts needed to effect and carry out the tests hereinafter detailed, and already referred to. This line corresponds to the two lines 59 and 60 shown on Figure 2, as far as intended function is concerned. In Figure 5 we have shown this line 87 brought to a unit 88 whereby the loads may be controlled by incremental amounts from the common control station. This will be referred to hereinafter.

In Figure 5 we have also shown the lines $89^a$, $89^b$ and $89^c$ extending from the units 82, which are the switching means, which comprises the Third Means previously defined. These lines $89^a$, $89^b$ and $89^c$ extend to a common control unit 90 whereby each switching means may be individually and selectively controlled. This showing is schematic, comprising a single line, but the arrangements actually used include such additional lines to each switching means, if any, as may be needed to effect switching both on and off under control from the location 90.

In Figure 5 we have also illustrated the units 91, 92 and 93, by schematic showing. These are the units previously referred to as "A," "B" and "C," and whose functions have been defined under such designations. As already stated, these may conveniently comprise units of the Moseley bridge type capable of performing the functions respectively assigned to said units. It is here noted that the unit 91 (being unit "A") which responds to the total network loss value is held at the loss value existing in the network due to the load and division of power supply existing prior to making the incremental increase of the loads during the tests to be hereinafter again referred to. Accordingly, this unit shall respond to and measure and indicate the total loss prior to the incremental increase of the loads during the test, and shall retain such measurement during the incremental load increase stage of the tests, so that such indicated loss value shown by unit 91 may be compared with the loss value determined after the incremental increase of the loads for such station test, such comparison being for the purpose of determining the difference between the total losses before and after such incremental load increase. When the unit 91 comprises a device of the Moseley bridge type which includes a servo-motor element to shift its indicator to proper indicating position, and also includes a potentiometer shifted by such servo-motor, it is evident that whenever a change of measured loss occurs, due to change of strength of the signal arriving over the total loss line 71, such servo-motor drive will shift the indication of this unit 91 corresponding to such changed signal value. We have therefore provided means to interrupt the operation of the indication shifting means during a proper portion of the test to thus temporarily retain the indication of the unit 91 at that total network loss value which existed prior to the incremental change. In Figure 5 we have indicated each of the lines 89ª, 89ᵇ and 89ᶜ as being also connected to a switching element 94ª, 94ᵇ or 94ᶜ as the case may be, all of said switching elements delivering to a common line 95 by which a switch 216 controlling the servo-motor or other suitable element of the unit 91 is controlled. (See also Fig. 7.) Thus whenever any one of the units 82ª, 82ᵇ or 82ᶜ is operated to the open condition under which the unit 76ª, 76ᵇ or 76ᶜ, is to be held at its indication of the power prior to the incremental change of the loads, the unit 91 will also be held at its network total loss indication. Also, when the units 82ª, 82ᵇ or 82ᶜ are restored to their original operation conditions, the unit 91 will be restored to its operative condition so that it will again indicate and respond to the total network loss value as signalled over the line 71. Said switching elements 94ª, 94ᵇ and 94ᶜ may alternatively be connected to the load increase control line 87.

Reference may now be had to Figure 7 wherein we have shown, more or less schematically, a unit of the general type of the aforesaid Moseley bridge, but modified in certain particulars to meet present needs. Units of this type are shown in this figure for the Second Means, the Fifth Means, the Sixth Means, and the Seventh Means; and in the showing of the Second Means we have also indicated schematically the showing of the Third Means as a supplemental control.

Referring to the Second Means showing, being the unit 76 of Figure 5, the same includes a laterally moving pointer and contact element 96 conveniently carried by the endless belt or tension member 97 travelling over the pulleys 98 and 99; and this pointer reads on a scale 100 by which the value of the pointer position indication may be indicated to the observer. There is provided a companion belt or tension element 101 adjacent to the belt 97, and travelling over the pulleys 102 and 103. This companion belt 101 carries the two contacts 104 and 105 in position for engagement with the pointer contact 96, such contacts 104 and 105 being oppositely electrified as indicated in the figure. The contact finger or pointer 96 is connected through the medium of a flexible or electrical connection 106 with a line leading to a suitable generation control unit, such as schematically indicated at 83 in Figure 5, so that the "generator" or power contributing unit 31 (or 32 or 33, as the case may be) will have its output increased or decreased according to which one of the contacts 104 or 105 is momentarily engaged by the pointer contact 96. Thus, by setting the belt 101 in one direction or the other, correspondingly determining the positions of the contacts 104 and 105 to the right or the left, the control line 106 will be correspondingly energized for correction or change of the generator's output. Conveniently, we have shown the servo-motor unit 107 in connection with the line 106 and controlled thereby, such servo-motor unit acting to raise or lower the generator's output as determined by the nature of the electrification, either positive or negative, of the line 106. A switch 108 is shown in said line so that, upon occasion the control of the generator's output may be made inoperative.

Another servo-motor unit 109 is provided in driving connection with the belt 97 as shown in Figure 7 so that said servo-motor may shift said belt back and forth under control of a control unit. This control unit includes the balanced circuit unit 110 including the reference cell 111, and acting through the servo-amplifier 112, according to conventional practice. From the thermoverter 75, acting as a power measuring unit, and delivering a D. C. potential which is proportionate to the power being measured, there extend the lines 113 and 114 (for the station in question). The potential between these lines is thus a measure of the power being contributed by the generating station in question. Connections from these lines are brought to the balanced circuit 110 for comparison with the reference cell 111, and any needed correction indicated by the value of the potential delivered over the lines will be reflected in a corrective operation of the servo-motor 109. Thus, with the belt 101 and contacts 104 and 105 set to a selected position or value the generator will be required to vary its output from time to time to maintain that selected output, since any departure from such selected output, as measured by the thermoverter, will be at once reflected by a corrective operation of the servo-motor 109 acting to shift the belt 97 slightly in the one direction or the other, thus establishing engagement of the pointer contact 96 with the one contact or the other of the pair 104—105.

We have, however, provided the switch 115 in the line leading to the servo-motor so that, on occasion the operation of the servo-motor may be made ineffective for corrective purposes. This switch 115 is schematically indicated as controlled by the magnets 116 and 117, such control including the armature 118 and the connection 119 therefrom to the switch. The purpose of such switch will appear more in detail hereinafter. This switch is the Third Means already defined.

The servo-motor unit 109 also is connected to the potentiometers 120 and 121 as indicated by the lines 122. These connections and potentiometers are such that the lines 123—124 leading from the potentiometer 120, and the lines 125—126 leading from the potentiometer 121, both carry potential differences proportional to the position of the pointer 96, being therefore also the indicated power output of the generator in question while the servo-motor was effectively connected to the control 110, namely, prior to opening of the switch 115. Therefore any incremental increase of the power output of such generator will not affect the positions of these potentiometers.

We have also indicated in Figure 7 the unit 76 as being provided with means to shift the belt 101 independently of the other operations previously described, and by remote control. Such means includes the pulley 127 acting on said belt (or instead of a pulley, the element 127 may be a sprocket in case the element 101 is a chain), so that drive of such pulley in either direction will correspondingly shift the positions of the contacts 104 and 105, thereby also changing the position of the pointer at which a null condition will occur. This pulley 127 is driven by a small shaft 128 on which are located the two toothed elements 129 and 130. Magnets 131 and 132 are provided corresponding to these elements 129 and 130, such magnets acting through their armatures on suitable pawl elements so that energization of one magnet will ratchet its element 129 or 130 as the case may be in one direction, and energization of the other magnet will ratchet its element 130 or 129 as the case may be in the opposite direction. The arrangement is such that one impulse delivered to either magnet will effect shift of the belt 101 in corresponding direction by an amount to produce an incremental change in the output of the generator; and one impulse delivered to the other magnet will effect shift of said belt in return direction by the same amount, thus restoring the generator to its original output condition. The remote control lines 133 and 134 connect to the two magnets for their individual energization. We have also schematically indicated the magnetic clutch 135 dividing the shaft between the pulley 127 and the elements 129 and 130. This clutch is normally disengaged, so that the adjustments of position of the belt 101 previously described may be effected without drag or interference from the elements 129 and 130, the pulley 127 remaining in engagement with the belt, but being allowed to rotate freely according to any belt shifts effected by means other than by the magnets 131 and 132.

In Figure 5 we have indicated schematically these incremental power change control devices by the units 84 on the units 76; and have also indicated the remote control lines for controlling the magnets 131 and 132 by single lines 85 extending from such units 84 to the central control unit 86.

As will appear presently, the original setting of the pointer contact element 96 is intended to be effected manually to a power indication position representing that output value which the judgment of the user determines as probably representing a fair proportion of the total power requirements of the network to produce the optimum division of power between the contributing stations. Thereafter, changes in the setting of such pointer contact for each station will be made, either manually or automatically, as hereinafter disclosed.

Again, the original settings of these pointer contacts for the several contributing stations may correspond to the actual power contributions being made by the several stations then on the system. In such case it may be desired to determine whether the division of total power requirements is correct for the optimum operation, and if not in what direction the division of total power should be made in order to improve the operating conditions. In such cases the actual operating conditions, namely, the power contributions of the several stations, may be transmitted to the location of the present equipment by any suitable intelligence means, for the information of the operator of this equipment. He may then adjust his equipment to the power indications of the pointers 96 according to such received information, as a starting point in his operations. Alternately, provision may be made for telemetering the actual values of the power outputs of the several stations, directly to the units 76 (or 80) corresponding to the several stations, so that said units will automatically assume pointer positions corresponding to such actual power output values.

In Figure 5 we have shown the units 86$^a$, 80$^b$ and 80$^c$ for the several contributing stations, and these units are also shown schematically in Figure 7. When provided, each of these units will include telemetering means 136 whereby the belt 101 of such unit will be set by telemeter signal to the power position telemetered from the real contributing stations, so that the set of units for such station, shown in Figures 5 and 7, will be controlled and operated accordingly. It is to be noted, however, that since the pointers 96 of both of the units 76 and 80 serve the generator control unit 107 it is necessary that either the pointer 96 of the unit 76 or that of the unit 80 may be made ineffective while the other unit is in operation. Accordingly, we have shown the switches 108 and 137 included in the lines 106 and 106' which lead from the two pointers to the generator control unit 107. In Figure 5 we have shown a switch 106'' in the line leading from the units 76 and 80 to the corresponding generator control unit 81. Such single switch 106'' performs the selective functions of the individual switches 108 and 137 above explained. The remote control Third Means unit 138 is also indicated for the unit 80, to operate the switch 115' of the unit 80, it being contemplated that such unit 80 shall also include the incremental advancing or retarding means corresponding to the pulley 127 and connected elements for shifting the belt back and forth during the successive tests hereinafter described. Alternatively, the telemetering unit 136 may be incorporated into the unit 76, and suitable provisions made in such unit so that the belt 101 of such unit may be set back and forth either manually, or by telemetering operation, as selected; the remaining elements of such unit 76 then being operated in their intended manner.

The unit 78, being the Fifth Means unit, is shown schematically in fragmentary form in Figure 7. It consists of another device, such as a modified Moseley bridge unit. It is provided with the balanced circuit unit 139 controlling the servo-motor unit 140 by which a potentiometer 141 is operated, the unit 139 being controlled by the unit 142 to which are brought the potential representing the original power output of the generator, over the lines 143, and the increased power output of such generator, over the lines 144 which are a continuation of the lines 113 and 114 from the thermoverter. The increased power output above referred to is that increase produced by the incremental rise in power output produced by the operation of the magnet 131 or 132 when energized by a pulse coming over the line 133 or 134. The unit 142 serves, through the unit 139 and connected parts, to produce an indication from the potentiometer 141 which is proportional to the difference between the voltages from the lines 143 and 144. This difference of potential is proportional to $\Delta P$. It will be referred to hereinafter.

A line 145 extends from the potentiometer 141 of each of the units 78 to a common control unit in Figure 5, so that the values of $\Delta P$ for the several stations, may be successively brought into use during the tests hereinafter referred to.

The unit 77, being the Sixth Means previously defined, is also shown in Figure 7. This unit determines and gives an indication proportional to the value of F for the station under test, and under the load or output being delivered by such station and in conformity with the incremental cost rates of the several generating units of such station which are then on the busbars; and on the further assumption that the generating units so on the station's busbars also loaded, when possible to such loads as will produce values of "$f$" for such generating units, which values are equal. The further assumption is made that if needed, controls will be provided for one or more of the generating units to limit their several outputs at high and/or low output values, the remaining non-limited units being allowed to carry any additional amounts of output needed to provide the required total station output, and with such other generating units all operating under the condition of equal "$f$'s." (It is noted that the lower case designation of "$f$" is used as denoting the incremental cost rate for a generating unit as distinguished from the incremental cost rate, F, of the station as a whole).

Figure 3:
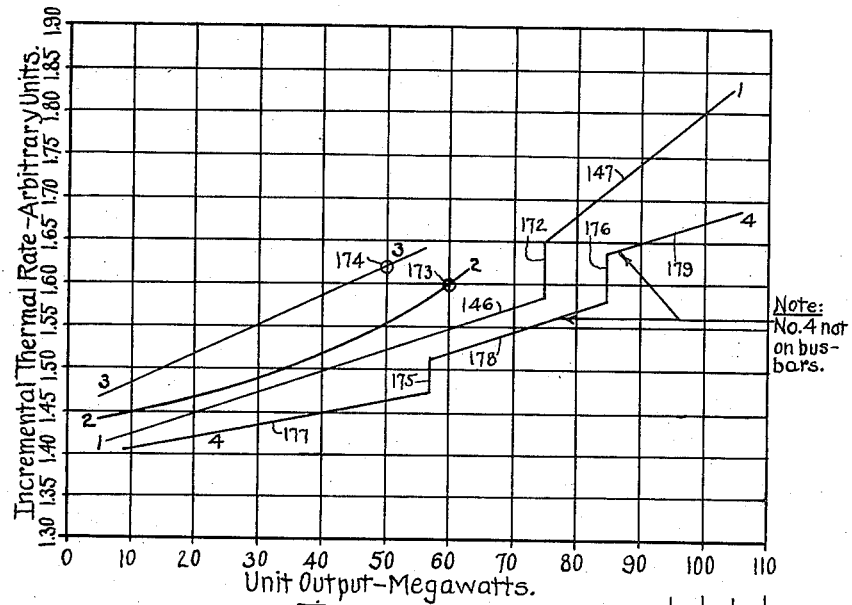
Figure 4:
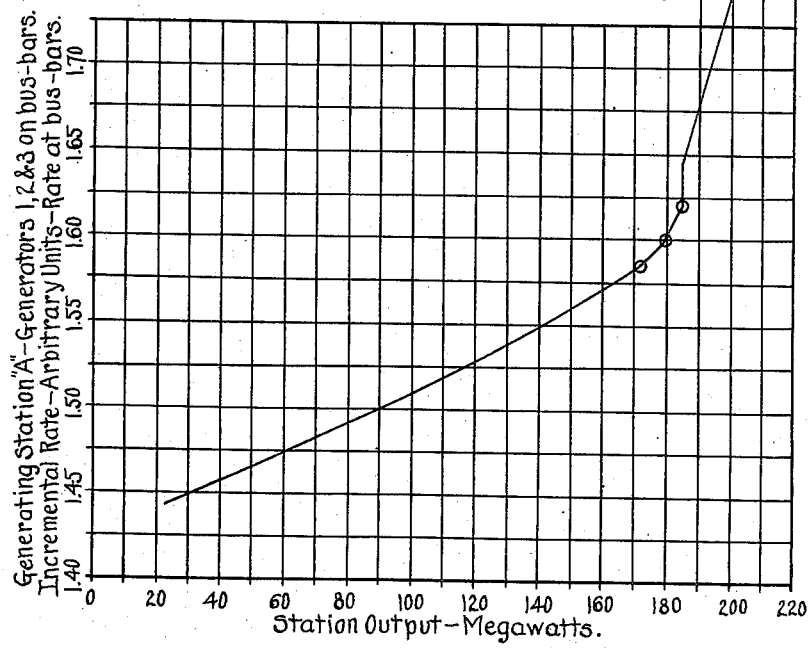

In Figure 3 we have shown typical incremental cost curves for four generating units of a station, as already explained. We have also indicated high limits of output permissible for the units "2" and "3," and have assumed that only the units "1," "2" and "3" are on the busbars. In Figure 4 we have shown the combined or overall incremental cost curve for the combined operations of such three generating units, and on the assumptions previously stated. Since the form and values of "F" (for the station as a whole), typified by the curve of Figure 4 depend on what generating units are on the busbars it follows that the unit 77, to be widely useful should include the provision of means whereby it is possible to ensure that said unit shall give its indications of the value of F for the station and its output as affected by the specific generating units assumed to be on such station's busbars. In the schematic showing of the unit "Sixth Means," being the unit 77, we have shown arrangements whereby the combined or overall F will be determined and indicated for three generating units having incremental cost curves of the general forms of the curves shown at "1," "2" and "3" in Figure 3. In Figure 7 we have shown the three sections "I," "II" and "III" which correspond to said curves 1, 2 and 3 of Figure 3, respectively. These sections are characterized by the fact that under operation all of them are subjected to the same potential and that each section shall carry a current whose value is proportional to the value of the output being delivered by the generating unit to which such section refers. The potential above referred to represents the incremental rate or cost at which the generating units are operating, so that since all of the sections are subjected to the same potential, all of the generating units must be operating at the same incremental cost rate. These operations are further explained as follows:

Referring again to Figure 3, it is noted that the curve 3 has a slant such that for zero output said curve would, if extended backwardly, pass through the ordinate or vertical line at some positive value; that is, this curve 3, when so extended, has a value greater than zero for all positive values of unit output. Likewise, the portion 146 of the curve 1 of Figure 3 is a straight line which when extended would pass through the zero unit output value at a value greater than zero, being a positive value; but it is seen that the portion 147 of this curve 1 would, if extended backwardly to the zero abscissa or zero unit output value, intersect the abscissa line at a negative value position. It is also noted that the curve 2 is concave upwardly.

In Figure 7 we provided a pair of common lines 148 and 149. We have also provided a transformer 150 whose primary 151 is supplied by a fixed potential so that its secondary 152 also delivers a fixed potential difference. The line 148 connects to one side of such secondary. The other line 149 connects through a low resistance shunt 153 to a line 190 which extends to the adjustable contact 191 of a potentiometer 192. Said potentiometer connects by a line 193 to the transformer secondary 152. Thus the potential between the lines 149 and 148 is equal to that delivered by the transformer secondary 152 as modified by the potentiometer at the then adjusted position of the contact 191. That contact is adjusted as to its position as follows:

The potentiometer 120 of the unit 76 has its terminals connected to the lines 194 and 195. The primary 196 of a transformer 197 is connected across the shunt 153 so that the secondary 198 of such transformer delivers a potential proportional to the drop across the shunt and thus proportional to the value of the current flowing in the line 149 (being the total current through all of the sections I, II and III). The line 194 connects to one end of the secondary 198 and the other line 195 connects to one side of the amplifier 199 serving a servo-motor unit 200. The other side of said amplifier connects by the line 201 to the other end of the secondary 198 of the transformer 197. Thus the amplifier 199 is subjected to a control potential dependent on the power simulating potential from the potentiometer 120 as modified by the potential from the secondary 198. This latter in turn is directly proportional to the current flowing in the line 149 and therefore proportional to the combined powers of the generating units in operation for the station in question. Accordingly, any discrepancy between the indicated power of the station (as simulated by the total value of the current in the line 148) and the indicated power for the station in question (as shown by the potential delivered by the potentiometer 120) will be reflected in a corrective effect at the servo-unit 199—200. This will result in such slight shift as may be needed to effect correction of the current flowing in the line 149 by change of the potential between the lines 148 and 149. This correction is made by slightly raising or lowering the potential added to or taken from the secondary 152, by the potentiometer 192. Thus the potential between the lines 148 and 149 is made to come to that value at which it will exactly simulate the value of F for the station in question, when the total power contributed by that station is the amount indicated by the potentiometer 120 and under the condition that all of the generating units of the station in question are operating at equal values of $f$ (incremental cost rate for said generating units).

The section III includes a secondary 154 of a small transformer 155 whose primary 156 is supplied with a potential of fixed value, for example "$a$," as shown. This secondary is tapped, 157, so that the value of its potential delivered to the section III may be adjusted. Thus the potential of the left-hand end of the adjustable resistance 158 included in the section III may be adjusted, which is tantamount to raising or lowering the point at which the left-hand portion of the curve 3 of Figure 3 will intersect the zero output abscissa value. In Figure 7 we have indicated the primary 156 of the transformer 155 as being above the secondary 154, thus indicating that the effect of this transformer is to raise the zero end of the curve 3 of Figure 3 above the zero incremental value position. For any given potential impressed across that portion of the resistance unit 158 which is included in the section III, the current strength flowing through such section will be reciprocally proportional to the resistance value so included. The potential so impressed is equal to that existing between the lines 148 and 149 as modified by the secondary of the transformer 155. Accordingly, the current flow through the section III will be represented by a straight line of the characteristics of the curve 3 of Figure 3, it being noted that the modification of potential produced by the secondary 154 is equivalent to shifting the zero Incremental Rate point of the curve 3 to the left of the Zero-Unit-Output position by an amount proportional to the value of such modification. Accordingly, the line or curve 3 may be simulated by the current flowing through section III, by proper adjustments of the secondary tap and of the resistance connection 159. In Figure 7 we have indicated the current value by the designation $I_3$, but this is done merely for convenience.

Next, the section I includes the two sub-sections, $I^a$ and $I^b$ which deliver to a common line 160 connected to the line 149. The sub-section $I^a$ includes the transformer 161 having its primary 162 indicated above its secondary 163, and such sub-section also includes the variable resistance 164. The sub-section $I^b$ includes the transformer 165 having its primary 166 below its secondary 167, thus indicating that this transformer secondary will act to reduce the potential delivered to the resistance element 168 by an amount dependent on the adjusted condition of such secondary 167. Accordingly, the line representing variation of current value with potential corresponding to the sub-section $I^a$ will intersect the Unit Output line at a point to the left of the zero position of Unit Output, and the line representing variation of current value with potential corresponding to the sub-section $I^b$ will intersect the Unit Output line at a point to the right of the zero position of Unit Output. Thus the sub-section $I^a$ may be made, by proper adjustments of its transformer secondary 163 and its resistance 164, to deliver a current whose value simulates the section 146 of the curve 1 of Figure 3, and the sub-section $I^b$ may be made, by proper adjustments of its transformer secondary 167 and its resistance 168, to deliver current whose value simulates the section 147 of the curve 1 of Figure 3. Both of the sections are connected to the line 160 through switches 169 and 170 which are gang controlled by the element 171, so that as the one switch is opened or closed, the other is oppositely operated. Thus, the movements of this switch unit serve to shift the section I to either its sub-section $I^a$ or its sub-section $I^b$ as required to correctly simulate the form of the curve 1 of Figure 3. The current flowing through the section I is conveniently indicated by the designation $I_1$.

The control of the switches 169 and 170, through the medium of the element 171 is effected by a relay operation based on whether or not, for a given power output from the station, and taking into consideration which of the generating units are at the time on the busbars, and for the condition that the incremental rates for all of such generating units are, if possible, made equal by proper division of the station's output between such generating units, the required output from generating unit 1 is greater than or less than the discontinuity shown at the point 172 in curve 1 of Figure 3. Consideration must also be given to the presence or absence of any limiting devices which may limit the powers severally contributed by the other generating units then on the busbars. Such points of power limitation for the units 2 and 3 are shown, in Figure 3, at the values indicated by the circles 173 and 174. It is not deemed necessary to here illustrate and describe such relay and other associated devices. It is noted that the Incremental Rate curve 4 for another generating unit, Figure 3, includes two points of discontinuity, 175 and 176. Accordingly, such curve contains three sections 177, 178 and 179, and a section IV of the unit 77 to simulate, by a current value, the value of the power being delivered by such other generating unit, 4, would include three sub-sections of the same characters as the sub-sections I$^a$ and I$^b$ already detailed, together with appropriate switching and control means. We have not deemed it necessary to further illustrate and describe such devices herein.

Section II of the unit 77 includes the transformer 180 having its primary 181 supplied with the fixed potential "a," and its secondary 182 tapped so that desired secondary potential may be obtained. The variable resistance 183 is placed in series with the secondary 182, so that the current delivered through such section II is proportional to such resistance, and the effects of the transformer secondary are according to the principles already explained in connection with sections I and III. The current from section II is delivered over the connection 184 to the line 149, thus adding to said line a current of value as determined by such section. A servo-unit 185 is provided for shifting the position of the contact 186 of the variable resistance and the tap setting of the variable ratio transformer to thus vary such resistance and series voltage according to the signals received by such servo-unit. It is to be noted that since the curve 2 of Figure 3 is not a straight line its ordinal value and its intercept vary with variations of the output of the generating unit to which such curve corresponds according to some relationship which is not a direct proportion to the power delivered by the generating unit. Accordingly, we provide suitable operating connections actuated according to the value of output of such generating unit, to shift the contact 186 and the transformer tap contact 186$^a$ through the medium of the servo-unit. Thus the current flowing through the section II may be made to simulate, by its value, the power being delivered by the generating unit in question. This current is added to the other currents delivered to the line 149. Accordingly, the current flowing in the line 149 simulates, by its value, the combined powers being delivered by all of the generators on the bushbars of the station in question, and the difference of potential between the lines 148 and 149 is proportional to the Incremental Rate or cost, $f$, at which the generators are operating, as affected by any limiting conditions imposed on the permitted output of any generator by suitable controls.

Switches 187, 188 and 189 are provided in the connections 158$^a$, 160 and 184 of the three sections, respectively, so that any group of generating units may be included in the testing operations being conducted.

A transformer 202 has its primary 203 connected to the two lines 148 and 149 and is thus subjected to the potential existing between said lines at all times. Thus said primary is at all times subjected to a potential which is proportional to the factor F for the generating station in question. The secondary 204 of this transformer connects to the lines 205 and 206. The value of said potential between the lines 148 and 149 is proportional to the incremental rate on the basis of thermal units. The Incremental Cost in dollars depends on the B. t. u. value of the fuel used and also the cost of fuel per unit weight or volume. To convert the potential between the lines 148 and 149 into a potential which is proportional to the Incremental Cost of energy in dollars we have shown the transformer secondary 204 as being tapped, and the line 205 as being provided with the adjustable contact 205' so that the ratio of voltage transformation may be brought to a value which will correctly translate the Incremental B. t. u. Rate into the desired Incremental Cost Rate as the potential between the lines 205 and 206.

The unit 79, being the Seventh Means, receives its information from previously described units, and translates it after proper processing, into the factor or constant "C" for the station in question. It is remembered that such constant C is equal to F divided by 1 minus L, L being equal to ΔL divided by ΔP, and always having a value less than unity. The factor ΔL divided by ΔP is determined and signalled by the unit 93, presently to be described. This factor L is signalled over the line 207 as an A. C. voltage, shown in Figure 7. A transformer 208 has its secondary 209 connected in series with the line 207, and its primary 210 is supplied with a fixed voltage. This secondary adds one unit of opposite potential to the value of the signal coming over the line 207, so that the terminal of the secondary 209 carries a potential of 1 minus L. This is delivered to the unit 79. A switch 212 provided in the line 207 serves to control delivery of such value of 1 minus L to the unit 79.

The unit 79 may be any suitable form of divider unit by which the signalled values of F and 1 minus L may be divided, for delivery of the signal or indication of the value of C. Conveniently this unit is a Moseley type bridge with its circuits so arranged that the quotient C appears as the position of the pointer 213 in comparison to the scale 214, said pointer being actuated to such position by the servo-motor 215' under proper control of the signals arriving over the lines 205, 206 and 207. This enables the operator to see what is the value of C for the station in question, for comparison with the values of C determined for the other stations contributing to the network. From such comparison the operator may then judge as to what corrections should be made in the division of total required power between the stations in order to bring the values of the C's closer to equality.

In the present disclosures we have also included means to automatically compare the values of the several C's and to make correctional changes in the division of power between the stations, followed by further correctional changes and tests as may be needed to finally bring the division of power to such proportions among the stations as is acceptable. In Figure 7 we have shown the unit 79 as provided with a bourdon wire connection 215 to the pointer positioning means, so that by such bourdon wire the value of C may be communicated to the common comparison and evaluating unit, presently to be described. Such form of connection to the common comparison and evaluation unit is shown by way of example only, and as a simple means, and we do not intend to limit ourselves to such form of connection, except as we may do so in the claims to follow.

During a set of tests to determine the values of the C's for the several contributing stations, and corresponding to a given division of total required power between the stations, said values of C for the several stations are determined one at a time, as already explained. In order to prevent any shift of the indication of the pointer 213 and the corresponding bourdon wire 215 which assumes a position harmonious with such pointer, until the succeeding necessary determinations have been made, provision is made to assure against such improper shift. In the disclosures of Figure 7 such provision takes the form of a switch 337 located in the servo-motor line 338. While such switch is open the servo-motor, pointer, and bourdon wire will retain their adjusted positions until the switch is again closed and the values of the signals arriving over the lines 205—206, and 207, and/or others, change. To operate this switch we have shown the two magnets 339 and 340 acting oppositely on the armature 341. This armature is connected, as shown at 342, with the switch 337. The arrangement is such that armature throw in one direction opens the switch and leaves the switch open, and that subsequent armature throw in the other direction again closes the switch and leaves it closed. The terminals 343 and 344 from the two magnets are connected to the central control units so that proper impulses are delivered to the magnets to operate the switch back and forth in proper timing with respect to other related operations. The arrangement is such that promptly after the value of C for any given station has been determined and the corresponding servo-motor 215' has moved its pointer 213 and bourdon wire to correct positions, the switch 337 is opened by an impulse at the magnet 339 or 340, as the case may be. The pointer and bourdon wire will then be held by friction or otherwise in their so-moved positions until again moved by operation of the servo-motor. The switch then stays open until a succeeding impulse comes to the other magnet. The arrangement is such that said succeeding impulse is not delivered until after the C values for all of the stations have been determined and properly compared. Then the proper impulses are sent to the switch closing magnets for all of the units 79 so that said units are again rendered operative to determine and indicate the new values of the C's according to the principles and functions disclosed elsewhere herein.

The units 91, 92 and 93 are used successively in connection with the so-far described units 76, 77, 78 and 79 (and if desired, 80), during the comparison tests for determining the C values for the stations, corresponding to any selected division of the total power requirements. Therefore, suitable switching means are provided for connecting these units 91, 92 and 93 successively to the proper portions of the units 76 to 79 of each contributing station in turn. Such switching means will be disclosed hereinafter. Such switching means also performs certain additional functions needed to effect the desired tests.

The details of the units 91, 92 and 93 disclosed herein need not be illustrated and described, since, as already stated, these units may conveniently be Moseley type bridges, modified if need be, to perform the functions and produce the end results assigned to such units. Various of these functions and end results have already been explained herein. They include the operation of the unit 91 in such manner as to receive and hold, during succeeding test operations, the total network loss value as signalled over the line 71, prior to the incremental raising of the load values and corresponding rise of contributed power of the station under test to meet the changed conditions imposed by such increase of the load values; and the delivery of a signal to the unit 92 corresponding to such network loss value so held by unit 91; and the provision of means to prevent change of such so-held value by the unit 91 during the interval of such incremental increase of loads and contributed power; with restoration of the unit 91 to its normal operating condition when a test has been completed. Such change preventing means comprises a switch 216 in the unit 91 so arranged that when it is opened it prevents any servo operation change in the position of the potentiometer 217 indicated in Figure 7. The operations of this switch are controlled by the common control devices hereinafter described, both for opening and for subsequent closing of such switch.

The unit 92 acts to subtract the total network losses prior to the incremental change in the loads, as signalled by the unit 91, from the total network losses after such incremental change of the loads, as signalled directly over the line 71 of Figure 5. Thus the unit 92 acts only as a subtracting instrument. The difference determined by this unit is signalled to the unit 93.

The unit 93 acts as a dividing unit. It receives the value of ΔL as signalled by the unit 92; and divides such value by the value of ΔP as signalled by the unit 78. Unit 92 then delivers the quotient, being the value of L, to the unit 93, as already explained.

Further detailed description of the units 91, 92 and 93 is deemed unnecessary.

Reference is now made to Figure 5 for study in connection with Figure 6, in particular. These figures disclose schematically, an arrangement whereby the necessary tests for determining the disparity between the values of the C's for the several stations, and for effecting changes in the division of total power requirements between the contributing stations may be centralized, and brought into convenient association so that such tests may be rapidly conducted, and the optimum division may be most quickly and accurately determined. Having made a series of tests to determine the values of C for the several stations under a given division of the total power requirements, the corrections of division to better the operation may be made manually; but we have also disclosed means to automatically effect successive changes in the division of the power as successive tests are cyclically conducted, so that the complete series of tests and corrections may be automatically carried through to a point which results in the optimum division of the total power requirements, or to any selected stopping point as determined by the operator. The optimum condition is, as disclosed, that condition in which the C's for all of the stations are of substantially the same value. At the conclusion of each set of tests, wherein, for a selected division of the total power the value of C is determined for each station in succession, such C's are compared in order to determine which stations have C values of greatest difference from the general average. Study of the mathematical processes whereby the form of the C determinations is made, will show that a succeeding changed division of the total power, for the purpose of improving the operation by a re-division of power such that the C's are more nearly in equality, should be a re-division in which that station or stations showing lowest C values should have their proportions increased, with corresponding decreases of the proportions of power supplied by those stations showing the highest C values. The sizes of proportionate changes to be made will be related to the amounts by which the highest and lowest C values depart from the general average.

We have already shown that the C value for each station and corresponding to a selected division of the total power requirements is indicated by the position of the pointer 213 of the unit 79 for such station, as compared to its scale 214. In the simple embodiment of our invention, these C values for the several stations may be noted by the operator after completion of each set of tests. A comparison of the C values thus noted will then enable the operator to determine the re-division of total power for his next set of tests. The readjustments of various elements needed to conduct such next set of tests may then be manually made, and the tests carried through according to the principles already described in detail. The C values resulting from such next set of tests will then become available for further studies and tests as required.

If desired the bourdon wires 215 from the several units 79 for the contributing stations may be brought to a common location and there act to produce indications for the operator's use. In Figures 5 and 6, however, we have shown a unit 218, legended "C-Tester" to which all of the bourdon wires are brought and where their several positions of extension or retraction are compared when each set of tests has been made to the point of giving all of the C indications. One embodiment of such unit 218 is shown in Figures 8, 9, 10 and 11, in more or less schematic form, and will be described hereinafter. This unit 218 or equivalent unit, determines the relative positions of extension of the bourdon wires, and thus the relative values of the C's for the stations under the division of total power requirements existing at the time of such tests. When the bourdon wires have all responded to the C value positions signals are sent to the magnets 131 or 132 of the units 76 for those stations for which the high and low C values were determined, to slightly lower the power contributed by the high C value station, and to slightly raise the power contributed by the low C value station.

The set of tests which must be performed by the operator or the equipment to determine the C values have been previously detailed herein. In the light of the unit elements disclosed for various of the units provided for each station, as well as the need of using certain of the units 91, 92 and 93 during certain portions of the tests, and the further need of holding the unit 91 at the Total Loss indication position which it determined prior to the incremental change of the loads, together with the restoration of such unit to its normally functioning condition after a set of tests has been concluded, each set of tests is performed in proper cycling time by a cycling unit shown at 219 in Figure 5. This unit must go through its cycle of controls for the test operations on each of the group of units 76, 77, 78 and 79 for a station, together with proper coordination of the units 91 and 93 with the said set of units 76 to 79, in order to determine the value of C for the station in question. This unit 219 must therefore go through its cycle of operations for each of the contributing stations, with proper provision that during each such cycle it will be acting on the units 76 to 79 for the station then under test, and also with proper provision for correct coordination of the units 91 and 93 with such units 76 to 79 during such cycle. We have therefore shown schematically in Figure 5 the unit 220 legended "Program." This unit controls the operations of the cycling unit 219 to cause said cycling unit to effect its cycle of operations in progress at any given time on the proper set of the units 76 to 79, with correct coordination with the units 91 and 93. We have also, in Figure 5 shown the unit 221 legended "C-Tester Control" or "Cycle Terminus". This unit is also connected to the Program unit 220 in such manner that after the cycling unit 219 has completed a cycle of test operation controls for each of the contributing stations, so that the C values for all of the stations have been indicated at the location of the unit 218 by setting of the bourdon wires to positions corresponding to the C values, the unit 218 will be caused to function, to determine the high and low C value stations, and to effect the small changes in power contributed by said stations, one lower and the other higher, as already explained. Having effected such changes in the contributed powers of such two stations, the entire process will be repeated, with slight corrections of the contributions of those stations for which high and low C values are determined, at the end of each set of tests until finally all of the C values for all of the stations are substantially the same. Provision is made for stopping the cycling operation at conclusion of each cycle, or for allowing the cycling operations to repeat as many times as may be needed.

The schematic showing of the C-Tester unit 218 is contained in Figures 8, 9, 10 and 11. This unit includes the two parallel rock shafts 222 and 223, suitably journalled, the journals not being shown. The companion plates 224 and 225 are connected to these shafts and extend in generally the same direction from the shafts. These plates terminate in the edge flange portions 226 and 227, so that by rocking the two shafts in opposite directions the flanges are caused to approach each other with their faces in opposition.

Bourdon wire extensions 228, 229, 230 and 231, corresponding to four contributing stations, are supported vertically adjacent to the front edge of the flange 227, and the small plates 232, 233, 234 and 235 are secured to the upper ends of such bourdon wire extensions. Thus said plates move vertically with the wires to elevations corresponding to the C values of the respective stations. To the upper face of each such plate there are hinged the two angle shaped elements, 236 and 237 for each plate, such hinges permitting backward or clockwise rock of the elements 236 and 237 when viewed as in Figure 9. Light springs normally retain these elements 236 and 237 in the positions shown in the various figures, so that their upper angle legs extend substantially horizontally. Such condition is well shown in Figure 9. It is noted that the horizontal legs of the elements 237 lie in slightly higher planes than the horizontal legs of the elements 236, well shown in Figures 9, 10 and 11.

To the bottom face of the leg of the element 236 there is secured a sheet of insulating material 238 which carries the contact element 239, and to the top face of the leg 237 there is secured a sheet of insulating material 240 which carries the contact element 241. The flexible leads 242 and 243 connect to the contacts 239 and 241, respectively, such leads being connected to certain controls as will presently appear. Since there is a set of the contacts 239 and 241 for each of the bourdon wire extensions, and thus for each of the contributing stations, we have designated the wires with suffixes "a," "b," "c" and "d," respectively, it being noted that in the schematic showings of Figure 6 there are included elements for conducting tests on four contributing stations.

The top flange 226 carries a set of contacts 244 in vertical alignment with the contacts 241 of the higher set, and the flange 227 carries a set of contacts 245 in vertical alignment with the contacts 239 of the lower set. All of these contacts 244 and 245 are adjustable vertically by slight amounts and are securely held in their adjusted positions in their respective flanges. It is seen that by rocking the plates 224 and 225 slightly towards each other by corresponding rocks of the shafts 222 and 223, the contacts 244 will move towards the corresponding contacts 241, and the contacts 245 will move towards the corresponding contacts 239. By initially setting all of the contacts 244 into alignment with each other parallel to the shafts, and by setting all of the contacts 245 into alignment with each other parallel to the shafts, a condition will be produced such that as the two shafts are rocked to correspondingly move the flanges 226 and 227 towards each other one, only, of the contacts 244 will engage the corresponding and highest contact 241, and one, only, of the contacts 245 will engage the corresponding and lowest contact 239. None of the other contacts 244 will engage a contact 241 and none of the other contacts 245 will engage a contact 239. Thus a selective high and low contact engagement will be produced.

By initially adjusting all of the bourdon wires and their plates 232, 233, 234 and 235 so that all of the contacts 239 lie in alignment and parallel to the shafts when the bourdon wires are in their lowermost or zero positions (the contacts 241 likewise lying in alignment and parallel to the shafts under such conditions) it is evident that the contact 239 for that bourdon wire having the smallest vertical upward projection (and therefore corresponding to the station whose C value is smallest) will be first engaged by one of the contacts 245 carried by the flange 227, and also that no other one of the contacts 239 will be engaged for such bourdon wire projection condition. It is also evident that under the conditions above stated, the contact 241 for that bourdon wire having the largest vertical upward projection (and therefore corresponding to the station whose C value is largest) will be first engaged by one of the contacts 244 carried by the flange 226, and also that no other one of the contacts 241 will be engaged for such bourdon wire projection condition. Thus a selection will be made of that one of the contacts 239 which will be engaged, and of that one of the contacts 241 which will be engaged, by an operation in which both of the flanges are moved towards each other at the same time, and with provision for permitting each flange to come to rest at the position which it occupies at the time of engagement of the first contact according to the above operations. By electrifying both of the plates 224 and 225 of the same polarity (for example, positive), it will be seen that those leads 242 and 243 which connect to the engaged ones of the contacts 239 and 241 will be brought into circuits by which other operations may be produced; and that one only, of such leads for each of the two bourdon wires controlling the corresponding contacts will be thus electrified.

The leads 242 will be connected to the magnets 131 (or 132) of the corresponding units 76, and the leads 243 will be connected to the magnets 132 (or 131) of the corresponding units 76, so that the belt 101 of the unit 76 corresponding to the contributing station showing the lowest C will be shifted slightly in the direction to raise its power, and so that the belt 101 of the unit 76 corresponding to the contributing station showing the highest C will be shifted slightly in the direction to lower its power. Thus the desired corrective action will be produced by such rock of the two shafts 222 and 223.

Normally both of the shafts are rocked in direction to separate their flanges 226 and 227. This result is produced by the weights 246 and 247 suspended from lines 248 and 249 wrapped on the pulleys 250 and 251 on the shafts, the line 248 passing over the idler pulley 252 as shown in Figure 8. These weights are preferably of such magnitudes that they slightly overbalance the rocking tendencies produced by the plates 224 and 225, so that normally said plates are separated sufficiently to assure disengagement of the contacts 244 and 245 from the highest possible and the lowest possible contacting positions produced by the bourdon wires. Suitable stops (not shown) may be provided to limit the separating swings of the rock shafts.

Pulleys 253 and 254 are connected to the shafts 222 and 223, respectively. Light lines 255 and 256 wrap on and are connected to said pulleys, the free ends of such lines connecting to the light springs 257 and 258, respectively. The free ends of these springs are connected to a light cross bar 259 to which is connected the central link 260 by a connection which allows the bar to rock slightly as needed to ensure engagement of contacts of both of the plate flanges with the corresponding bourdon wire adjusted contacts, and at the same time ensure good engagements of the contacts with each other. The armature 261 connected to the link 260 is acted upon by the solenoid 262. Drawing the armature into the solenoid serves to cause both shafts to rock contrarily, thus bringing their contacts 244 and 245 into the engagements already explained; and the springs permit each shaft and its plate to be arrested in its movement when its contact engages with the bourdon wire supported contact, while permitting the other shaft and plate, if need be, to continue further slight rock to bring about the intended contact engagements produced thereby. Thus the energization of the solenoid 262 produces the desired sequence of operations to effect slight increase of the power output of one contributing station, and slight decrease of power output of the other contributing station.

In order to enable, if desired, the power contribution of each generating station to be limited in amount at either a high or a low limit, or both, we have made provision to effect such results, as follows:

Each of the units 76 (and 80, if used), is provided with adjustable contacts 263 and 264 (shown in Figure 7) which will be engaged by the pointer contact 96 at adjusted high and low power output positions, to thus electrify the one or the other of said contacts 263 and 264. These contacts are connected to corresponding solenoids 265 and 266 carried in position to act magnetically on corresponding armatures 267 and 268 of magnetizable material carried by the angle elements 236 and 237 carried by the plates 232, 233, 234 and 235 on the bourdon wires, it being remembered that said angle elements are hinged to said bourdon wire supported plates. By energizing any one of the solenoids the corresponding angle element will be rocked clockwise when seen as in Figure 9, to a point such that the corresponding contact 239 or 241 and its angle leg 236 or 237 is clear of the movements of the flange 226 during the rocking movements of the shaft 222, and such that the contact 239 or 241 carried by such angle leg will not be engaged by a contact 244 or 245 as the case may be, when the shafts are rocked to move the flanges towards each other. Thus, too, such contact will not be engaged by a contact carried by a flange. Therefore no impulse will be sent to the magnet 131 or 132 of the corresponding unit 76, and the power output of the contributing station will not be increased or decreased above or below the value corresponding to the contact 263 or 264, as the case may be.

The unit so far described is shown as carried within a housing 269, of which the wall 270 may be formed of non-magnetic material if need be in order to not interfere with the proper functioning of the magnets and solenoids 265 and 266 on their respective armatures 267 and 268. Conveniently the bourdon wires carry short squared rod sections 271 at their upper ends to which are connected the plates 232, 233, 234 and 235, such squared rod sections being slidably set through fixtures 272 which are also provided with squared openings, so that the rods cannot rotate. Thus the plates above referred to are retained in proper position against rock, so as to ensure correct functioning of the various parts.

In Figure 6 we have shown, schematically, the cycling unit 219, the program unit 220, and the C-tester control unit 221, as well as the C-tester unit, 218, itself. Each of the units 219, 220 and 221 comprises a rotating element carrying various contacts which are engaged by brushes in conventional manner; and the units 220 and 221 rotate once for each complete set of tests, whereas the cycling unit rotates once for the test for each generating unit. In Figure 6 we have shown four generating unit sets of the units corresponding to 76, 78 and 79 shown in other figures, as well as the load incremental control unit 88. Accordingly, we have also provided, in the cycling unit 219 a section corresponding to each generator section set of units, four in number, designated respectively by the suffixes "a," "b," "c" and "d." All of these sections rotate at equal speeds, being carried by a common shaft 274. They have identical sets of contacts, and brushes therefor synchronously located.

The unit 220 serves all four of the sections of the unit 219 in regular succession, and without overlaps. The unit 221 is carried by the same shaft 275 as the unit 220 and rotates at the same speed as said unit. The four sections of the unit 219 are served in succession by the unit 220, and then the unit 221 acts to serve the C-tester unit and associated elements. Accordingly, the shaft 275 carrying the unit 220 and 221 is rotated at one-fifth speed as compared to the shaft 274. Also, the rotations of the two shafts are synchronized so that each of the sections 220 "a," "b," "c" and "d" serves its corresponding section of the unit 219 in proper timing, as will soon appear. The sections 220 "a," "b," "c" and "d" are also set to serve their sections of the unit 219 during four consecutive fifths of the rotation of the shaft 275, and during the fifth fifth of said shaft's rotation the unit 221 comes into action. Thus, the necessary tests may be made on all four of the groups of units 76 to 79 for the four generator stations, to gather together the four C values, and then during the final fifth of a revolution of the shaft 275 the unit 221 operates to cause the C-tester and associated elements to make the C comparisons, and to effect the slight re-divisions of total required power preparatory to the next set of tests.

Both of the shafts 274 and 275 are conveniently driven by the same motor 276, through suitable gearing to the produce the desired one to five speed ratio above explained. The control of this motor will be referred to hereinafter.

A pair of lines 277 and 278 extends from the magnets 116 and 117 to the section of the unit 219 corresponding to the station served by the unit 76 from which such lines extend (note that the four pairs of lines 277 and 278 are shown with suffixes "a," "b," "c" and "d" corresponding to the station served); the lines 133 and 134 which lead from the magnets 131 and 132 are carried to suitable points for control from the unit 218, being the C-comparator and tester; the line 145 from each of the units 78 is carried to the section of the unit 219 corresponding to the station in question; and the line 279 connects each of the units 79 of the station in question to the unit 219. The load increment control unit 88 is also shown, being connected by the pairs of lines 280 and 281 to each of the sections of the unit 219 for control by each such section. The lines 282 and 283 connect the contacts 263 and 264 of each unit 76 to the corresponding solenoids 265 and 266 of the C-tester unit 218.

During the test conducted for each contributing station to determine the value of C for such station and under the then existing division of total required power the following operations must follow in sequence; first, the line 278 must be energized to cause opening of the switch 115 of the corresponding unit 76; second, the line 280 must be energized to cause raising of the loads by the incremental amounts already explained, to thus impose the added burden on the power supply system, all of which added burden is assumed by the generating station controlled by the unit 76 in question. Examination of Figure 6 shows that all of the pairs of lines 280 and 281 serve the common lines 284 and 285 extending to the load control unit 88 so that said unit is controlled by each of the sections 219 in turn. Third, the line 145 from the unit 78 must be connected to the unit 93 to deliver the value of the factor $\Delta P$ to said unit 93, for the test then being made, and at substantially the same time the line 279 must also be connected to the unit 93 to deliver to the unit 79 for the station in question the value of C for such station. To accomplish the foregoing functions the following provisions have been shown:

Each of the units 219 is provided with the contacts 286, 287, 288 and 289 which are stationary, and to which the corresponding lines are connected. The unit is also provided with brushes which rotate with the shaft 274 and are positioned along the shaft at positions to engage the contacts above referred to in proper succession. These brushes are connected by suitable slip ring arrangements (not shown) with the lines 292, 293 and 294, for the section of the unit 219 being considered. These lines in turn extend to the unit 220 where they connect to brushes which are engaged by rotating contacts 295, 296 and 297 of such unit 220. The brushes of the unit 220 are stationary, and the brushes of each set corresponding to the sections "a," "b," "c" and "d" of the unit 219, are located at successive positions around the shaft 275 corresponding to four successive fifths of the revolution of that shaft. Accordingly, as the shaft 275 rotates, its contacts 296, 297 and 295 will successively engage its brushes corresponding to the four sections of the unit 219, and such engagements will be singular to the brushes for such section so that no overlaps occur as between the signals for the four sections of the unit 219. The fifth arcuate portion of the unit 220 is blank so that the contacts 295, 296 and 297 do not engage any brushes during such portion of the rotation of the shaft.

The contacts 295, 296 and 297 are respectively connected (through slip ring arrangements not shown) to the lines 298, 299 and 300. The line 298 is connected to a positive connection, the line 300 is connected to the line 207 extending from the unit 93 and which line delivers the factor 1 minus $\Delta L$ divided by $\Delta P$, which factor must be transmitted to the unit 79, for determination of the value of C for the test in question, and the line 299 connects to the unit 93 for delivery to that unit the factor $\Delta P$ determined by the unit 78 then in use for processing by said unit 93 to give the determination of the value of 1 minus $\Delta L$ divided by $\Delta P$, already referred to. Accordingly, as the shaft 275 rotates the contacts 295, 296 and 297 deliver positive potential to the line 292, deliver the factor $\Delta P$ to the unit 93, and deliver from said unit 93 the factor 1 minus $\Delta L$ divided by $\Delta P$. Thus, due to the successive positioning of the brushes of the unit 220, the aforesaid connections are successively established for the sections "a," "b," "c" and "d" of the unit 219. Thereafter as each successive fifth revolution of the shaft 275 is accomplished, such connections are completed as needed to bring the section of the unit 219 then in use through its successive stages, up to the point of determination of the value of C for the contributing station then under test.

After such determination of the value of C for the test being conducted, it is necessary to open the switch 337 by energizing the magnet 339 or 340, for the reason already explained, and it is also necessary to restore the loads to their original condition, and to again shift the switch of the unit 76 to its closed position, all of these operations to be performed prior to commencing the test for the next contributing station. Accordingly we have also shown the line 281 as being connected to the contact 301 of the section of the unit 219 then in use, the line 345 as connected to the switch opening contact 346, and the line 277 as being connected to the contact 302 of such section. The line 345 connects to the switch opening magnet 339 or 340 of the unit 79. These contacts 346, 301 and 302 are so located that the opening of the switch 337 precedes the leaving of the brushes from the contacts 288 and 289, so that the switch 337 is opened after the C value has been determined and indicated and while the bourdon wire is still being held in its corresponding C value position, for reasons already explained; and afterwards the brushes move away from the contacts 288 and 289 and the loads are restored to their original condition slightly prior to the closing of the switch of the unit 76. The switches 337 for all of the units 79 are closed by energization of their closing magnets after the C values for all of the stations have been determined and compared, and slight power division change, as already explained.

Upon closing the switch 115 of the unit 76 no corrective action of said unit will occur, due to the fact that the loads have been restored to the same condition as existed prior to the opening of that switch.

It was previously pointed out that the switch 216 of the unit 91 must be opened prior to raising the loads for the test to be conducted. In Figure 5 we have shown the elements 94$^a$, 94$^b$ and 94$^c$ which represent switches as previously explained. These switches are also shown in Figure 6 (with the additional switch element 94$^d$ since such figure carries representations for four contributing stations instead of the three represented in Figure 5). The lines 277 and 278 which control the switches 115 of the units 76 are also connected by sets of lines 303 and 304 to the switches 94 so that as each of the switches 115 is opened the corresponding switch 94 is also operated. This set of switches 94 controls delivery of current to the line 305 by which the switch 216 of the unit 91 is controlled. Whenever said line 305 is energized by the closing of one of the switches 94 the switch 216 is opened, and said switch 216 again closes when such line 305 is de-energized. Accordingly the switch 216 is opened and permitted to close synchronously with the operations of the switch 115 of the unit 76 then in use, so that the operations of the unit 91 are properly conducted.

As the test to determine each value of C for a contributing station is completed the pointer 213 of the corresponding unit 79 will be moved to a position corresponding to the C value so determined. This will result in projection of the bourdon wire 215 connected to said pointer to a corresponding amount (In Figures 8 and 9 the wires 228, 229, 230 and 231 are indicated, being "extensions" of the bourdon wires for the several pointers of the units 79). Thus the "extensions" shown in Figures 8 and 9 will be projected correspondingly. Directly after completion of the test aforesaid for a contributing station, such unit 79 will be isolated from the unit 93 by the operation of the unit 219 and/or the unit 221. Thus the control of the unit 93 over the unit 79 will be terminated at the instant of such isolation. Still such unit 79 will remain connected to the unit 77 through the lines 205 and 206 so that the control of such unit 77 on the unit 79 will continue. The switches 337 of the several units 79, and the provisions for opening said switches already recited will ensure against any change in the position of the bourdon wire 215 of each corresponding unit 79 until the comparison operations have been completed.

Having completed a test for each of the contributing stations and thus set and ensured retention of all of the corresponding bourdon wires to correct positions corresponding to the values of C determined for such stations, the unit 218 is to be actuated to signal to those units corresponding to the high and low C values, for raising the setting of the one unit slightly and lowering the setting of the other unit slightly, preparatory to another set of tests. Such actuation of the unit 218 is produced by momentarily energizing the solenoid 262 of the unit 218. To effect this result we have provided the unit 221 which rotates once for each complete set of tests, being carried by the shaft 275. This unit carries the contact 307 which engages the stationary contact 308 at the proper time in the rotation of the shaft. Thereby an impulse of current is sent to the solenoid 262 for the intended purpose. Shortly thereafter the contact 307 may engage another stationary contact 309 which is connected by a line 347 to the switch closing magnets 340 or 339 of all of the units 79, thus restoring the units 79 to their normal functioning conditions, preparatory to the conducting of the next set of tests. The lines 345 and 347 (see Fig. 6) are connected to the proper lines 344 or 343, as the case may be, of the units 79.

In Figure 6 we have indicated a "Cyclic Cut-Out Switch" 310 which is driven by the shaft section 311 connected to the shaft 275. This unit is of construction to terminate current supply to the motor 276 upon completion of each complete set of tests and after the C comparator unit 218 has operated to determine the high and low C value stations. Thus, under the condition that this unit 310 is permitted to thus function the tests will then be brought to completion. We have also indicated the line 312 connected to a disabling unit within the unit 310 such that when such disabling unit is energized it will cause the unit 310 to assume a condition such that the completion of the set of tests will not discontinue current supply to the motor 276, so that said motor will then continue to drive the units 219, 220 and 221, and their contacts, through successive cycles of operations, as long as the line 312 remains unbroken. A switch 313 is indicated in the line 312 for restoring the functioning of the unit 310 to its normal one-cycle condition when such switch is open. A contact 307 carried by the unit 221 serves to energize the various stationary contacts 308, 309 and 312 in proper timing.

Under the ideal condition that all of the C values are brought into exact equality by bringing the final division of total required power into proper condition it is evident that all of the contacts 239 and 241 would engage with corresponding contacts 245 and 244 of the comparator unit 218 at the same time. Accordingly, impulses to both increase and decrease the outputs of all stations would be sent simultaneously to all of the units 76 corresponding to such stations. Evidently such an ideal condition would be improbable of attainment, but if attained it would merely bring about a hunting condition with slight back and forth adjustments of the several pointers 96 of the units 76. It is also desirable to provide for termination of the cycling operations of the control devices when a condition of division has been attained sufficiently close to the ideal to satisfy practical requirements. We have indicated provision to effect such termination in Figure 6, as follows:

A relay 314 is placed in each of the lines 242 and 243 which extend from the contacts 239 and 241 of the comparator unit 218 to the magnets 131 and 132 of the units 76, so that whenever any one of such lines is electrified by the operation of the comparator such relay will be energized to raise its contact 315 into engagement with the contacts 316 and 317 of such relay. These contacts 316 and 317 are placed in a series circuit 318 so that whenever all of the relays are energized at the same time such circuit will be closed. A unit 319 is provided in connection with the switch 313 to open such switch under the foregoing conditions, and thus to ensure termination of the cycling operations at conclusion of the cycle then in progress. Thus the cycling operations will be automatically terminated at the proper time, in case they have not been intentionally terminated at an earlier time.

We have previously made reference to the units 81 interposed between the unit 76 (or 80) and the corresponding generating station 31, 32 or 33, as the case may be (see Fig. 5), showing that said units 81 are power control units which control the operations of said generating station simulating units 31, 32 and/or 33 to cause delivery of required power outputs into the network, but under control of said units 76, or 80. We have also mentioned the additional control unit or element 83 (see Fig. 5) which may be included in the controls of the generating stations for special purposes. These special purposes are to bring the miniature loads and generation into equality with the specified value of total generation and to control the vars and terminal voltages of the miniature generators. These results are accomplished by controlling the miniature generator outputs by adjusting the phase angle of the generator voltage of each generator station. Reference is now made to Figures 12, 13 and 14, as follows, said figures illustrating schematically the unit 83 above referred to:

Such control is effected by the servo-motors 107 (see Fig. 7). Said servo-motor acts to advance the phase position of the voltage applied to the grid 321 of the first amplifier tube of the generator. The basic phase adjusting circuit shown in Figures 12, 13 and 14, is well known and any decrease in the resistance 320 produces a small counterclockwise rotation of the vector 329.

If the generator loads are received by telemeter it is possible that otherwise insignificantly small errors in the telemetered data would indicate a total generator output slightly less than the actual sum of losses and delivered loads. Similarly, otherwise insignificant small errors in other metered data could lead to such a discrepancy. This would be unimportant except for the fact that servo-operated controls are provided to adjust each generator output to match the telemetered output by advancing its generator phase position. Any advance of the phase position of one generator supplying a plurality of fixed impedance loads would normally result in a decrease in power output of one or more other generators, which would in this case be advanced in phase by their servo-mechanisms. Such a condition could lead to all generators being substantially simultaneously advanced in phase without any of them actually increasing in power output until mechanical or other limit stops might prevent further adjustment, and without some or all machines attaining outputs corresponding to the telemetered data.

If the voltage applied to the input grid 321 is slightly increased in magnitude as it is advanced in phase, the total power absorbed by the fixed impedance loads also increases and the several generators may be individually brought to power outputs corresponding to telemetered data by their respective servo-mechanisms. This increase in voltage is accomplished by moving the grounded tap of the secondary of the transformer 323 slightly off center. Thus the voltage $V_1$ of winding 322 is made slightly less than the voltage $V_2$ of winding 324. If the voltage $o$—$a$ is impressed from grid 321 to ground and resistance 320 is decreased, the grid voltage becomes $o$—$b$, having been rotated counterclockwise (advanced) and also slightly increased in magnitude.

The potentiometer 330 is inserted between the phase position adjusting circuit and the generator for the purpose of permitting adjustment of the fraction of the voltage output of the potentiometer actually impressed on the generator input terminals. This permits adjustment of generator input voltage without disabling the automatic variation of this output voltage with phase position as above described. Adjustment of generator output voltage may be manual through this potentiometer or the potentiometer may be servo-operated in response to station bus voltage or station reactive volt-ampere output.

In Figures 16, 17 and 18 we have shown a modified or substitute means for effecting various of the controls needed in the performance of the various tests hereinbefore explained. Referring first to Figure 16 we have shown, schematically and by block diagram, the generator 31 (see Fig. 7), the themoverter 75, the comparison circuit 110', the servo-unit 109', the potentiometer 120', the reference cell 331, the potentiometer 332, the comparison circuit 333, the control switch 334 by which either a telemetered signal voltage or a locally manually adjusted voltage control may be delivered to the comparison unit 333 as desired to effect the original setting of said unit 333 corresponding to an assumed first try of the division of powers contributed by the several stations, the servo-unit 107' which controls the potentiometer 334' which controls the generator output, and the supplemental generator control unit 335 corresponding to the unit shown in Figures 12, 13 and 14. When using this arrangement for effecting the controls the local voltage supplied by 334 is delivered to unit 333. This unit 333 compares the voltage delivered at 334 with that delivered by the unit 332 and the servo-unit 107' drives the generator control unit 334', shifting the phase of the generator 31 (or 32 or 33, as the case may be). The thermoverter 75 reads the output of the generator 31 and delivers to the Moseley device (shown schematically in Fig. 7, and indicated at 110', 109', 331 and 332 in Fig. 16) a voltage proportional to the generator output as derived by the thermoverter. The voltage output delivered by the potentiometer 332 is then proportional to the generator output as measured by the potentiometer. This is the normal condition of operation of the modification shown in Fig. 16.

When a generating station output is to be held constant (during the raising of the loads by a small percentage with corresponding raised amounts of the total load and any increased losses to be carried by the contributing station under test, alone), the arrangement of Fig. 16 is switched to that of Fig. 17, for each of such contributing stations whose output is so to be held constant. In this case the control voltages supplied to the comparison circuit 333 are derived from 332 and 75 instead of from 334 and 332 respectively, as in the previous case.

When the generating station now being considered is the single station which is to assume the increased burden due to the raising of the loads by the small percentage, and also to carry the increased losses occasioned by such load increases, the arrangement of Fig. 16 is switched to that shown in Fig. 18; it being further noted that the arrangement shown in Fig. 18 will deliver directly a voltage which is proportional to the difference between the original power contributed by the station now being considered, and the power contributed by it to supply the additional load requirements as well as the additional losses. This difference is ΔP. To effect these results the voltage from the thermoverter 75 is transferred from the unit 110' and placed in bucking series with the output from unit 332 so that the net output from unit 332 is proportional to ΔP.

Reference has been made to the provision, if desired, and as a portion of the equipment herein disclosed, of means to automatically signal to the real power contributing stations from time to time the power contribution amounts which should be supplied by said stations, as determined by the present equipment, to place into effect the power divisions among the real stations for maximum economy of operation. As a further feature, reference has also been made to the provision of means in the present equipment for actually adjusting the governors or other control devices of the several generators of the contributing stations to ensure delivery by each station of the so-determined amount of power contribution. We have, in the present application, disclosed means for automatically producing either or both of said results, as follows:

The thermoverter 75 of the miniature network equipment corresponding to each contributing station affords means at the completion of each test, to determine and indicate the power contribution of such station on the basis of the division of total power requirements for the test then being made. At the completion of each cycle of tests for all of the contributing stations on the basis of the power division corresponding to such cycle, the thermoverters then indicate the powers assumed to be contributed by the several stations. If the results of any cycle of tests show that the optimum division of total required power has been determined, then the corresponding thermoverter power indication for each station shows the amount of power which should be contributed by such station to obtain the optimum operating condition for the system as a whole, and on the assumed basis of operation of each real power station. Such optimum division is indicated when all of the relays 314 have been energized at the same time so as to bring the cycling operations to a conclusion. If for any reason the operator should determine that the division of power corresponding to some test prior to the complete attainment of the ideal condition just referred to, was satisfactory or desirable, the thermoverter indications would nevertheless show the power contributions assumed to be made by the several stations during the conduct of such earlier test.

In Figure 6 we have shown, schematically, each of the thermoverters 75ª, 75ᵇ, 75ᶜ and 75ᵈ adjacent to the corresponding unit 76, and have also shown the lines 113 and 114 extending from each thermoverter to the corresponding unit 76. These lines are also shown in Figure 7. It has been shown that the D. C. potential between these lines is a direct function of the power being contributed by each generating station to the network, and also varies proportionately to such power output from such generating station to the network. Adjacent to each of the units 76 we have also shown, schematically, a telemetering unit, 348ª, 348ᵇ, 348ᶜ or 348ᵈ, as the case may be, and connected to the corresponding lines 113 and 114. Each of these telemetering units includes means to translate the power simulating potential between the lines 113 and 114 into a signal of identifying characteristics corresponding to the amount of such indicated power, and also corresponding to the particular station which is simulated by the corresponding units 76 and 75. Thus, when each of these telemetering units is properly energized it will send out a signal corresponding to its particular real power station, and corresponding to the power indicated by the thermoverter at the time of sending such signal. We have also indicated the line 349 extending between the control station and each of the telemetering units, and connected to such units. This arrangement is such that when said line 349 is energized each of the telemetering units is caused to send out or emit its signal corresponding to the power indication being received by it from the lines 113 and 114, and also its identifying signal so that such power indication signal will be properly received and translated by the real power station to which such telemetering unit corresponds. All of these signals will be sent out simultaneously or in rapid sequence, according to well understood principles known in the telemetering arts. We do not deem it necessary to here detail either the circuits or the construction of such telemetering units, nor their detailed mode of operation, as devices for performing like or similar functions are well known in the electrical arts.

The signals emitted by such telemetering units may be sent either by radio or wire communication, but for purposes of illustration we have indicated the antennas 350ª, 350ᵇ, 350ᶜ and 350ᵈ in connection with said units.

Upon energizing the line 349 the power amount signals will be emitted as explained above. However, it is noted that such signals should be emitted after completion of a set of tests including all of the simulating power stations, and for a division of required power under which such tests were made. In other words, the sending of the correctional signals to the real power stations must be harmonized with the completion of a set of tests, and while the information is available as to the powers to be contributed by the several real stations. In this connection it is also noted that the unit 221 affords a means to effect such properly timed signal sending operation, when properly correlated with the other functions. Usually it will be desired to send such correctional data to the real power contributors only when the division of power has been found which gives substantially the optimum operation as previously explained. When this condition occurs the line 318 is electrified to the closing of all of the relays 314, due to the fact that all of the C's have been brought to equality or to a close approximation thereto. Accordingly, we have shown the relay 351 connected to the line 318 so that when said line is electrified by the bringing of all of the C's to substantial equality, such relay 351 will be closed, raising its armature and the contact 352 into engagement with the contacts 353 and 354. The contact 354 connects to the line 318 and the contact 353 connects to the line 349, so that the closing of the relay serves to deliver the desired impulse to the telemetering units harmoniously with the attainment of the condition of substantial equality between all of the C's.

In case it may be desired to signal a set of power amounts to the several contributing stations, corresponding to a division of power corresponding to a test prior to the attainment of the ideal condition under which the just referred to signals are sent, this can be done manually by the operator as follows:

The line 349 connects to a contact 355 of the unit 221 by the line 356 in which is included the switch 357. The contact 355 is so located that it will engage the contact 307 of the unit 221 just after the re-division of powers has ben made by slightly raising the station of which the value of C is lowest, and slightly lowering the station of which the value of C is highest, according to the operations previously explained, but prior to commencement of a succeeding testing operation. Accordingly, when the operator decides to signal the real stations for a new division of power with corrected power outputs from the several stations, the depression of the switch 357 will be ineffective until the proper time arrives for sending the signals to the several stations, directly after the simulating equipment has effected the slight power changes found to be proper as a result of the test just completed. Directly thereafter the switch 357 should be released, and if further tests are not desired the cycling equipment may be brought to rest.

The telemetered signals thus sent to the contributing stations may be received as instructions to the proper power station authorities as to desirable changes of power outputs; or said signals may be arranged to act directly on the governors or other control devices to effect the desired changes of output automatically; or both such forms of signal reception may be provided for.

When a supplemental unit 80 is provided, in addition to the unit 76 for each power contributor, such unit 80 being arranged to receive telemetered information from the corresponding power contributing station as to the output being delivered by such station into the network, such unit is provided with the means shown at 136 in Figure 7 for effecting setting of the unit to the said station's output. This means 136 will therefore respond to the correctional change made in the real station's output corresponding to the telemetered information sent to such station by the corresponding unit 348.

If it should be desired to analyze and/or study the operating conditions of the network on the basis of the total hourly cost of fuel at each station, such analyses and/or studies may be greatly expedited and facilitated by use of portions of the equipment herein disclosed. In such case provision may be made of a potentiometer in the miniature network equipment for each station, which potentiometer is so arranged that it will develop and deliver a potential which is proportional to the total hourly cost of fuel consumed by such station in relation to the change of power output of such station. Such potentiometers will then deliver potentials for the several contributors which potentials will indicate the hourly fuel costs of the several stations for the division of total power requirements on which the test is based. The sum of such hourly fuel costs for the several stations will then be the total hourly fuel cost for all contributing stations on the basis of the assumed division of the total power requirements and the total losses attendant on such division. By making a series of successive tests with different assumed divisions of the total power requirements the total hourly fuel cost corresponding to such assumed divisions may be determined and compared and/or analyzed.

The foregoing is illustrative of an important use of a portion of the elements disclosed in this case, in which use those elements which are used perform in combination substantially the same functions as they perform when the complete combination of elements is used.

We claim:

1. A miniature network to simulate a real network which real network includes a plurality of network sections, loads connected to and fed by said real network, and means to supply power into said real network comprising a plurality of real power contributors in connection with the real network at different points of power supply, said miniature network including network sections connected to simulate corresponding real network sections, means in connection with the miniature network to simulate the amounts of the loads connected to the real network, and a plurality of means to supply power to the miniature network at points to simulate the points of power supply to the real network, together with means to determine the most economical division of total required power between the power contributors to the real network, comprising means to determine and indicate a simulation of the total losses in the network sections, means to determine and indicate a simulation of the amount of power supplied to each of the points of power supply to the network, means to change the amounts of all of the load simulations of the miniature network by a small proportion and all in substantially the same ratio, means to retain the power supply at each of said plurality of points of power supply to the miniature network except one selected point of power supply unchanged, means to change the power supply of said one point of power supply by that amount needed to fulfill the change in the power requirements of all of the simulating loads and the network losses with the simulating loads at said changed load amount, means to determine and indicate the differential between the amounts of the network losses before and after said load change, said means including means to accurately determine and deliver an electrical quantity proportional to the total loss value prior to the change in the amounts of all of the load simulations by said small proportion, and to accurately determine and deliver an electrical quantity proportional to the total loss value after the change in the amounts of all of the load simulations by said small proportion and to determine and deliver an electrical quantity which is proportional to the difference between said loss values prior to and after the change in the amounts of all of the load simulations as aforesaid means to determine and indicate the differential between the amounts of the power supplied at said one point before and after such load change, said means including means to determine and deliver an electrical quantity which is proportional to the amount of power supplied at said one point prior to the change in the amounts of all of the load simulations by said small proportion and to determine and deliver an electrical quantity which is proportional to the amount of power supplied at said one point after the change in the amounts of all of the load simulations by said small proportion and to determine and deliver an electrical quantity which is proportional to the difference between said power supply amounts before and after the change in the amounts of all of the load simulations aforesaid means to determine and deliver an electrical quantity which is proportional to the incremental cost of power supplied at said one point of power supply substantially at the rate of power supplied at said one point, means to determine and deliver an electrical quantity which is proportional to the ratio of the differential of the network losses before and after the load change divided by the differential of the amounts of power supplied at said one point before and after the load change, said means including means to compare the electrical quantity which is proportional to the difference between said loss values prior to and after the change in the amounts of all of the load simulations with the electrical quantity which is proportional to the difference between said power supply amounts before and after the change in the amounts of all of the load simulations and means to determine and deliver an electrical quantity which is proportional to the ratio of the aforesaid determined incremental cost of power divided by one minus the aforesaid determined ratio of the differential of network losses divided by the determined differential of power supplied at said one point of power supply said means including means to compare the electrical quantity which is proportional to the incremental cost of power supplied at said one point of power supply substantially at the rate of power supplied at said one point with an electrical quantity which is equal to one minus the electrical quantity which is proportional to the aforesaid differential of the network losses divided by the aforesaid differential of the amounts of power supplied at said one point.

2. Means as defined in claim 1, wherein said last named ratio is identified as a constant "C," together with means to determine and indicate said constant "C" for each of the means which supplies power to the miniature network for the condition of the amounts of the loads which are connected to the real network and for a specified division of total required power to supply said loads and the network losses.

3. Means as defined in claim 2, together with means to correlate and compare the values of said constant "C" for all of the several means which supply the power to the miniature network.

4. Means as defined in claim 3, together with means to change the division of the required power between the several means which supply the power to the miniature network.

5. Means as defined in claim 4, wherein said last named power division changing means acts to raise the proportion of power supplied by that power supply means of which the determined value of "C" is a minimum, and acts to lower the proportion of power supplied by that power supply means of which the determined value of "C" is a maximum.

6. Means as defined in claim 5, wherein the power division changing means acts to raise the minimum C value power supply so determined and to lower the maximum C value power supply so determined by amounts which are small percentages of the total power supplied to the network.

7. Means as defined in claim 3, wherein the correlation and comparison of the values of "C" for all of the several means which supply the power to the miniature network includes cycling means in which the values of "C" are progressively determined for the several power supply means, together with power division means to change the division of required power between the several means which supply the power to the miniature network, and means to cause the power division means to function at completion of each cycle of the cycling means to effect change of power division between the several means which supply the power to the miniature network in accordance with the comparison of the values of "C" as determined in such cycle of the cycling means.

8. Means as defined in claim 7, wherein the power division means is caused to function to raise the proportion of power supplied by that power supply means of which the determined value of "C" is a minimum, and to lower the proportion of power supplied by that power supply means of which the determined value of "C" is a maximum.

9. Means as defined in claim 7, together with means to terminate the cycling operation of the cycling means when the determined values of "C" for the several means which supply power to the miniature network are substantially equal in amount.

10. Means as defined in claim 8, together with means to terminate the cycling operation of the cycling means when the determined values of "C" for the several means which supply power to the miniature network are substantially equal in amount.

11. A miniature network to simulate a real network which real network includes a plurality of network sections, loads connected to and fed by said real network, and means to supply power into said real network comprising a plurality of real power contributors in connection with the real network at different points of power supply, said miniature network including network sections connected to simulate corresponding real network sections, means in connection with the miniature network to simulate the amounts of the loads connected to the real network, and a plurality of means to supply power to the miniature network at points to simulate the points of power supply to the real network, together with means to determine the most economical division of total required power between the power contributors to the real network, comprising means to determine and deliver an electrical quantity which is proportional to the total losses in the network section, means to determine and deliver an electrical quantity which is proportional to the amount of power supplied to each of the points of power supply to the network, means to change the amounts of all of the load simulations of the miniature network by a small proportion and all in substantially the same ratio, means to retain the power supply at each of said plurality of points of power supply to the miniature network except one selected point of power supply unchanged, means to change the power supply of said one point of power supply by that amount needed to fulfill the change in the power requirements of all of the simulating loads and the network losses with the simulating loads at said changed load amount, means to determine and deliver an electrical quantity proportional to the incremental loss rate of change compared to the incremental power supply rate of change corresponding to said small proportion change of the amounts of all of the load simulations of the miniature network, means to determine and deliver an electrical quantity proportional to the incremental cost of power supplied at said one point of power supply substantially at the rate of power supplied at said one point, and means to determine and deliver an electrical quantity proportional to the ratio of the aforesaid determined electrical quantity which is proportional to the incremental cost of power divided by one minus the aforesaid determined electrical quantity which is proportional to the incremental loss rate of change.

12. Means as defined in claim 11, wherein at least one of the real power contributors which is in connection with the real network includes more than one generating unit, and wherein the means which supplies power to the miniature network corresponding to said real power contributor to the real network includes means to simulate the values of the incremental costs of said real power contributor for various outputs of said real power contributor.

13. Means as defined in claim 12, wherein the generating units of said real power contributor have different incremental costs for equal power generation values, and wherein said means to determine the incremental cost of power supplied at said one point of power supply to the miniature network simulates the incremental cost of power supplied to the real network at the simulated amount of power supplied by such contributor to the real network.

14. A miniature network to simulate a real network having a plurality of network sections, loads connected to and fed by said real network, and means to supply power into said real network comprising a plurality of real power contributors in connection with the real network at different points of power supply, said miniature network including network sections connected to simulate corresponding real network sections, means in connection with the miniature network to simulate the amounts of the loads connected to the real network, and a plurality of means to supply power to the miniature network at points to simulate the points of power supply to the real network, together with means to determine the most economical division of total required power between the power contributors to the real network, comprising means to determine and deliver an electrical quantity proportional to the amount of power supplied to each of the points of power supply to the real network, corresponding to a pre-selected division of total required power between the plurality of power supply means of the simulating network to supply the loads which simulate the real network loads, means to retain the power supply at each of said simulating network points of power supply unchanged, means to make ineffective said retaining means for a selected one of the miniature network power supply means, to enable said miniature network power supply means to change its power supply and the amount of the aforesaid electrical quantity which is proportional to the amount of power supplied by said miniature network according to changed requirements of the network and the loads while retaining unchanged all of the other power supply means of the simulating network to supply unchanged amounts of power to the miniature network, means to determine and deliver an electrical quantity proportional to the amount of change of power supplied by said miniature network power supply means to the miniature network corresponding to a change of the amounts of the loads simulated by said miniature network while the amounts of power supplied to the miniature network by all of the other power supply means remain unchanged, means to determine and deliver an electrical quantity proportional to the incremental cost rate of each real network power supply means at various output rates of said real power supply means, means to determine and deliver an electrical quantity which is proportional to the total losses in the network sections, means to change the amounts of all of the load simulations of the miniature network by a small proportion and all in substantially the same ratio, means to determine and deliver an electrical quantity which is proportional to the change of electrical quantity which is proportional to the change of amount of said total losses which change corresponds to the change in the amounts of all of the load simulations, means to compare said change in the amount of the electrical quantity which is proportional to the total losses with the aforesaid amount of change of the electrical quantity which is proportional to the change of power supplied by said miniature network power supply means corresponding to the change of the amounts of the load simulations aforesaid and to determine and deliver an electrical quantity which is proportional to the rate of the incremental loss corresponding to said change of power supplied to the miniature network, and means to compare said electrical quantity which is proportional to the incremental cost of said power supply means corresponding to the power supplied to the miniature network by said power supply means with one minus said electrical quantity which is proportional to the rate of the incremental loss to determine the value of a constant for said miniature network power supply means and corresponding to said division of total required power between all of the power supply means of the miniature network.

15. Means as defined in claim 14, together with means to restore the amounts of all of the loads to their values prior to said change in said amounts, means to make effective said retaining means for said selected miniature network power supply means, means to make ineffective the retaining means for a second selected miniature network power supply means, and means to determine the value of said constant for said second selected power supply means and corresponding to said division of total required power between all of the power supply means of the miniature network.

16. Means as defined in claim 15, together with means to compare the values of said constant for said first selected and said second selected power supply means corresponding to said division of total required power between all of the power supply means of the miniature network.

17. Means to determine and indicate the most economical division of total required power between a plurality of power contributors to a real network, which network includes a plurality of power carrying sections and useful loads supplied by said network, said determining and indicating means including a miniature network comprising sections, and loads connected to the miniature network, the impedance values of the sections, the form of the miniature network, and the amounts of the loads connected to the miniature network simulating like qualities and values of the real network, and means to supply power to the miniature network at supply points corresponding to the points of power contribution to the real network, together with means to vary the amounts of power supplied to the miniature network at said points of power supply to fulfill the requirements for power to said load simulations and the network losses, means corresponding to each miniature network power supply means to produce a direct current potential of value proportional to the amount of power supplied by such power supply means, means to retain the amount of power supplied to the miniature network at each point of power supply constant, means to make inoperative the retaining means for a selected point of power supply, means to make a record of the value of said power supply proportional direct current potential corresponding to said selected point of power supply, means to produce a direct current potential proportional to the total losses of the network sections, means to make a record of the value of said loss proportional direct current potential, means to change the amounts of all of the loads connected to and fed by the miniature network by a small proportion and all in the same ratio with corresponding change of the total power requirements for the loads and the losses of the miniature network, means to cause the means which varies the amount of power supplied to said selected point of power supply to function to vary the power supplied at said selected point by an amount corresponding to said change of the total load and loss requirements, with corresponding change in the value of said power supply proportional direct current potential and with corresponding change in the value of said total losses proportional direct current potential, means to determine and indicate the difference between the values of the power supply proportional direct current potentials second above and first above defined, means to determine and indicate the difference between the values of the losses proportional direct current potentials second above and first above defined, means to compare and indicate the ratio of the difference between the losses proportional direct current potentials above defined divided by the difference between the power supply proportional direct current potentials above defined, said ratio being the incremental loss rate, means to produce a direct current potential which is proportional to the incremental cost rate of the power contributor to the real network corresponding to said selected point miniature network power supply means and substantially at the real power contribution amount simulated by the aforesaid power supply proportional direct current potential, and means to determine and indicate the ratio of said direct current potential which is proportional to the incremental cost rate direct current potential simulation, divided by the quantity unity minus the value which is the ratio between the losses proportional direct current potentials divided by the difference between the power supply proportional direct current potentials aforesaid.

18. Means as defined in claim 17, wherein said last named ratio is identified as a constant "C", together with means to restore the amounts of all of the loads to their values prior to said change in said amounts, means to make effective said retaining means for said selected miniature network power supply means, means to make ineffective the retaining means for a second selected miniature network power supply means, and means to determine the value of said constant for said second selected power supply means and corresponding to said division of total required power between all of the power supply means of the miniature network.

19. Means as defined in claim 18, together with means to compare the values of said constant for said first selected and said second selected power supply means corresponding to said division of total required power between all of the power supply means of the miniature network.

20. Means as defined in claim 19, together with means to raise the proportion of power supplied to the miniature network by said power supply means corresponding to which the value of said constant is the smaller, and to lower the proportion of power supplied to the miniature network by said power supply means corresponding to which the value of said constant is the larger.

21. Means as defined in claim 18, together with means to determine the value of said constant for each of the power supply means of the miniature network in rotation, for said division of total required power between all of the power supply means of the miniature network, and means to raise the proportion of power supplied to the miniature network by the power supply means corresponding to which the value of said constant is smallest, and to lower the proportion of power supplied to the miniature network by said power supply means corresponding to which the value of said constant is largest.

22. Means as defined in claim 21, together with means to cyclically repeat the determinations of the power supply means of the miniature network corresponding to the highest and the lowest values of said constant for each cyclical repetition, and to raise the proportion of power supplied to the miniature network by the power supply means corresponding to the lowest value of said constant for each such cycle and to lower the proportion of power supplied to the miniature network by the power supply means corresponding to the highest value of said constant for each such cycle.

23. Means to determine and indicate the most economical division of total required power between a plurality of power contributors to a real network, which network includes a plurality of power carrying sections and useful loads supplied by said network, said determining and indicating means including a miniature network comprising sections, and loads connected to the miniature network, the impedance values of the sections, the form of the miniature network, and the amounts of the loads connected to the miniature network simulating like qualities and values of the real network, and means to supply power to the miniature network at supply points corresponding to the points of power contribution to the real network, together with means to vary the amounts of power supplied to the miniature network at said points of power supply to fulfill the requirements for power to said load simulations and the network losses, including means to adjust the amounts of power supplied by said means at the several points of supply by a pre-selected division of said requirements among the several power supply means, means to effect a cycle of tests including a test corresponding to each point of power supply to determine for each such point the value of a constant corresponding to said pre-selected division of the power requirements among the several power supply means and to determine the relative values of such constant for the several points of power supply and corresponding to said pre-selected division, said test means including means to measure the power supplied to the miniature network at each point of power supply, means to deliver an electrical quantity proportional to the amount of power supplied at a selected test point at the beginning of a test for such point of power supply, means to deliver an electrical quantity proportional to the total losses of the network, means to make a record of said total losses proportional electrical quantity at the beginning of said test, means to retain the amounts of power supplied to the miniature network at all of the points of power supply except the power supply point of the test unchanged at the first mentioned adjusted amounts of power for said points, means to change the amounts of all of the loads connected to and fed by the network by a small proportion and all in the same ratio with corresponding change of the total power requirements for the loads and the losses of the miniature network, means to cause the power supply means of the test point of power supply to change the amount of power supply by said means an amount equal to the change of the total power requirements aforesaid, means to determine and deliver an electrical quantity proportional to the amount of the change in the losses corresponding to the change in the amounts of the loads aforesaid, means to determine and deliver an electrical quantity proportional to the amount of the change in the power supplied by said test point power supply means, means to determine and deliver an electrical quantity proportional to the ratio of the amount of the change in the electrical quantity which is proportional to the change in the losses aforesaid divided by the amount of the change in the electrical quantity which is proportional to the change in the power supplied by said test point power supply means, said ratio being identified as the incremental loss rate, means to determine and deliver an electrical qunatity which is proportional to the incremental cost rate for the real power network contributor to which the test point power supply means corresponds and at substantially the amount of the real power contribution which is simulated by the amount of power being contributed by said test point power supply means, and means to determine the value of said constant corresponding to said test point power supply means, comprising means to determine the ratio of said electrical quantity which is proportional to the change in the incremental cost rate divided by unity minus said electrical quantity which is proportional to the change in the incremental loss rate.

24. Means as defined in claim 23, together with means to restore the amounts of all of the loads to their values prior to said change with corresponding restoration of the losses to a total amount the same as prior to said change and corresponding restoration of the amount of the power supplied at said first test point of power supply to the same value as prior to said change, means to retain the amount of power supplied to the miniature network at its restored value, means to make ineffective said retaining means for the power supply means to a second test point of power supply to the miniature network, and means to determine the value of said constant for said second test point of power supply to the miniature network.

25. Means as defined in claim 24, together with means to compare the values of said constant for said first test point of power supply to the miniature network and said second test point of power supply to the miniature network.

26. Means as defined in claim 25, together with means to increase the proportion of power supplied by that power supply means corresponding to the smaller value of said constant and to decrease the proportion of power supplied by that power supply means corresponding to the larger value of said constant.

27. A miniature network to simulate a real network which real network includes a plurality of network sections, loads connected to and fed by said real network, and means to supply power into said real network comprising a plurality of real power contributors in connection with the real network at different points of power supply, said miniature network including network sections connected to simulate corresponding real network sections, means in connection with the miniature network to simulate the amounts of the loads connected to the real network, and a plurality of means to supply power to the miniature network at points to simulate the points of power supply to the real network, together with means to facilitate the determination of the most economical division of total required power between the power contributors to the real network, comprising means to determine and deliver an electrical quantity which is proportional to the total losses in the network sections, means to determine and deliver an electrical quantity which is proportional to the amount of power supplied to each of the points of power supply to the network, and means to change the amounts of all of the load simulations of the miniature network by a small proportion and all in substantially the same ratio.

28. A miniature network to simulate a real network which real network includes a plurality of network sections, loads connected to and fed by said real network, and means to supply power into said real network comprising a plurality of real power contributors in connection with the real network at different points of power supply, said miniature network including network sections connected to simulate corresponding real network sections, means in connection with the miniature network to simulate the amounts of the loads connected to the real network, and a plurality of means to supply power to the miniature network at points to simulate the points of power supply to the real network, together with means to facilitate the determination of the most economical division of total required power between the power contributors to the real network, comprising means to determine and deliver an electrical quantity proportional to the amount of power supplied to each of the points of power supply to the network, and means to change the amounts of all of the load simulations of the miniature network by a small proportion and all in substantially the same ratio, means to retain the power supply at each of said plurality of points of power supply to the miniature network except one selected point of power supply unchanged, means to change the power supply of said one point of power supply by that amount needed to fulfill the change in the power requirements of all of the simulating loads and the network losses with the simulating loads at said changed load amount.

29. Means as defined in claim 28, together with means to determine and deliver an electrical quantity proportional to the incremental cost of power supplied at said one point of power supply substantially at the rate of power supplied at said one point.

30. A miniature network to simulate a real network which real network includes a plurality of network sections, loads connected to and fed by said real network, and means to supply power into said real network comprising a plurality of real power contributors in connection with the real network at different points of power supply, said miniature network including network sections connected to simulate corresponding real network sections, means in connection with the miniature network to simulate the amounts of the loads connected to the real network, and a plurality of means to supply power to the miniature network at points to simulate the points of power supply to the real network, together with means to facilitate the determination of the most economical division of total required power between the power contributors to the real network, comprising means to determine and deliver an electrical quantity proportional to the total losses in the network sections, means to determine and deliver an electrical quantity proportional to the amount of power supplied to each of the points of power supply to the network, means to change the amounts of all of the load simulations of the miniature network by a small proportion and all in substantially the same ratio, means to retain the power supply at each of said plurality of points of power supply to the miniature network except one selected point of power supply unchanged, means to change the power supply of said one point of power supply by that amount needed to fulfill the change in the power requirements of all of the simulating loads and the network losses with the simulating loads at said changed load amount, means to determine and indicate the differential between the amounts of the electrical quantity which is proportional to the network losses before and after said load change, means to determine and indicate the differential between the amounts of the electrical quantity which is proportional to the power supplied at said one point before and after such load change, and means to determine and deliver an electrical quantity which is proportional to the incremental cost of power supplied at said one point of power supply substantially at the rate of power supplied at said one point.

31. Means as defined in claim 30, together with means to determine and indicate a constant for said one point of power supply which constant is a function of the electrical quantity which is proportional to said incremental cost of power supplied at said one point of power supply substantially at the rate of power supplied at said one point, divided by one minus the ratio of said first mentioned differential divided by said second mentioned differential and at the division of total required power between the several points of power supply to the miniature network corresponding to the amounts of power supplied to the network by said several power supply means.

32. Means as defined in claim 31, together with means to automatically determine and indicate the value of said constant corresponding to each of the points of power supply and corresponding to said division of total required power supplied to the network.

33. Means as defined in claim 32, together with intelligence transmitting means in connection with each means which determines and delivers an electrical quantity proportional to the amount of power supplied to one of the points of power supply to the miniature network, each said intelligence transmitting means including means to transmit to the corresponding real power contributor a signal of intelligence identifying the amount of power contributed to the miniature network at such point of power supply to the miniature network, and corresponding to said division of the total required power supplied to the network.

34. Means as defined in claim 33, together with means to compare the values of said constants for the several points of power supply corresponding to said division of total required power supplied to the network, and means to change the division of such total required power after said comparison of the values of said constants.

35. Means as defined in claim 34, together with means to cause each intelligence transmitting means to transmit to the corresponding real power contributor such amount of power identifying signal of intelligence after such change of division of total required power.

36. Means as defined in claim 35, together with means in connection with the real power contributor corresponding to each of the points of power supply to the miniature network to receive and translate the amount of power identifying signal.

37. Means as defined in claim 36, wherein said translating means includes means to control the power output of such real power contributor to an amount corresponding to the amount of power identified by such signal.

References Cited in the file of this patent

UNITED STATES PATENTS

| | | |
|---|---|---|
| 2,301,470 | Starr | Nov. 10, 1942 |
| 2,315,649 | Parker | Apr. 6, 1943 |
| 2,323,588 | Enns | July 6, 1943 |
| 2,491,095 | Enns | Dec. 13, 1949 |
| 2,613,237 | Starr | Oct. 7, 1952 |

OTHER REFERENCES

"Co-ordination of Fuel Cost and Transmission Loss by Use of the Network Analyzer To Determine Plant Loading Schedules" (George, Page and Ward) AIEE Technical Paper 49–242, September 1949.

"A Power System Analog and Network Computer" (Baldini and Frigill) AIEE Technical Paper 52–62, December 1951.

A Compact, Inexpensive A–C Network Analyzer (Kimbark, Starr and Van Ness) AIEE Technical Paper 52–113, December 1951.